United States Patent [19]

Hartsell et al.

[11] 4,298,946

[45] Nov. 3, 1981

[54] ELECTRONICALLY CONTROLLED PROGRAMMABLE DIGITAL THERMOSTAT

[75] Inventors: Glenn A. Hartsell, Dallas; F. Thomas Bilek, Plano, both of Tex.

[73] Assignee: Texas Instruments Incorporated, Dallas, Tex.

[21] Appl. No.: 970,019

[22] Filed: Dec. 18, 1978

[51] Int. Cl.[3] .......... G05D 23/32

[52] U.S. Cl. .......... 364/557; 165/14; 236/91 D; 364/104

[58] Field of Search .......... 364/104, 107, 120, 418, 364/464, 483, 493, 557, 900; 165/11-14, 32; 236/46 R, 91 D, 91 F

[56] References Cited

U.S. PATENT DOCUMENTS

| | | | |
|---|---|---|---|
| 4,093,997 | 6/1978 | Germer | 364/900 |
| 4,123,796 | 10/1978 | Shih | 364/418 |
| 4,165,532 | 8/1979 | Kendall et al. | 364/120 |
| 4,200,910 | 4/1980 | Hall | 364/104 |

*Primary Examiner*—Errol A. Krass

*Attorney, Agent, or Firm*—Rene' E. Grossman; James Comfort

[57] ABSTRACT

An electronic digital programmable wall thermostat system for controlling heating and cooling systems supplying an indoor area or space. The thermostat includes a digital clock, a display for displaying desired parameters of time and temperature and a data entry keyboard for programming the thermostat to maintain desired temperatures during selected time intervals. The heart of the system is a digital processor with memory, which responds to signals from a temperature sensing means which includes an analog to digital converter for controlling the heating and cooling systems in accordance with the sequence programmed therein. The system provides for conservation of energy by automatic system shutdown or setback when the heated or cooled space is unoccupied or during periods when activity in the space is minimal such as during sleeping hours. In a preferred embodiment, a single chip digital processor is used to control the operation of the thermostat system, the keyboard, display and temperature sensing means being selectively scanned from output terminals of the digital processor.

26 Claims, 16 Drawing Figures

61
75
71
62
AM
PM
TIME
TEMP
1 2 3 4 5
6 7 8 9 0
TMS 970
$S_P$ $S_G$ $S_F$ $S_E$ $S_D$ $S_C$ $S_B$ $S_A$
$V_I$
$D_1$ $D_2$ $D_3$ $D_4$
$D_8$ $D_6$
$K_1$ $K_2$ $K_4$ $K_8$
A/D ENABLE
A/D OUTPUT
A/D RESET
HEAT/COOL
BATT. INPUT
72
OSC.
60Hz CLK
74
SENSOR
A/D CONV.
73
64
66
COOL
OFF
HEAT
MAN
4 SET
2 SET

ELECTRONICALLY CONTROLLED PROGRAMMABLE DIGITAL THERMOSTAT

BACKGROUND

This invention relates to thermostats and in particular to electronic digital thermostats which are programmable for automatic operation.

Conventional thermostats employed in the home to control the temperature of an indoor area have generally involved the use of electromechanical devices such as spiral wound bimetallic temperature sensors which expand and contract in response to the ambient temperature of the area. The desired temperature is manually set and the system will control heating and/or cooling to maintain this desired temperature. Both heating and cooling anticipation resistors are often used to interject a known bias into the heating and cooling systems to prevent the system from overshooting the desired temperature.

These conventional systems have several disadvantages. First, only one temperature can be set in, necessitating the user's manually changing the set temperature as desired. This results in wasted energy if the system maintains the same temperature when the space is occupied as when it is unoccupied or during hours when the occupants are asleep. Secondly, the system is often sensitive to small temperature fluctuations, such as might occur when a door is momentarily opened, which causes the system to be activated unnecessarily and more often than needed. Thirdly, the anticipation resistors provide heating and/or cooling bias based on the heating and/or cooling duty cycles rather than the actual rate of change of the ambient temperature during heating and cooling operations. Accordingly, the system may maintain a temperature that is uncomfortably low or high. For example, under mild conditions in the summertime when the cooling system duty cycle is lower than normal, the cooling anticipation resistor exerts a heat bias which exposes the sensor to a temperature that is higher than the actual temperature of the cooled area. This reduces the effective set point and causes the system to run more than is needed and the temperature to be lower than desired.

Recent improvements in thermostat systems have involved the use of two or more thermostat units, each of which is designed to control the temperature during selected time periods. For example, one unit may be used to control temperature during the daytime while a second unit is used to control night temperatures. A clock timer may also be included for timekeeping operations. Such thermostats, for the most part, still use electromechanical relays and switches to control thermostat operations, as exemplified by U.S. Pat. Nos. 3,891,144; 3,197,165 and 4,014,499. An electronically controlled thermostat system for controlling the firing of a fueled heat generator is taught by Haviland, deceased et al (U.S. Pat. No. 4,049,193). This system includes separate night and day thermostats for controlling heating operations during the night and day, respectively, and a digital logic system with a digital clock for timekeeping operations. Four distinct logic circuits are needed to control the heat generator and to switch back and forth between the night and day thermostats.

With the present emphasis on energy conservation, the need for a "smart", inexpensive thermostat which is programmable to maintain desired temperatures during selected time periods so as to minimize energy consumption is widely recognized.

SUMMARY OF THE INVENTION

It is therefore one object of the present invention to provide an improved, inexpensive thermostat system for controlling the temperature of an indoor area while minimizing the amount of energy used.

It is another object of the invention to provide an electronic digital thermostat system which is programmable for automatically maintaining desired ambient temperatures in a given area during selected time periods and which displays desired parameters of time and temperature.

It is another object of the invention to provide an electronic digital thermostat which can be operated in a plurality of modes including fan continuous or automatic, heating or cooling, and automatic or manual.

It is yet another object of the invention to provide an electronic thermostat system which can be programmed for shutdown or setback periods when the heated and/or cooled area is unoccupied or activity is minimal.

It is a further object of the invention to provide an electronic thermostat system which operates only when necessary and does not react to transient temperature fluctuations and which anticipates reaching the desired ambient temperature so as to prevent wasteful overshooting of the desired temperature.

It is still a further object of the invention to provide an electronic thermostat system which can be controlled by a single chip semiconductor digital processor.

These and other objects are accomplished in accordance with the present invention which provides an electronic programmable wall thermostat system for controlling the heating and cooling systems supplying a given indoor area. The thermostat system is electrically coupled to the fan, heating and cooling systems and to an AC power supply for the operation thereof. The heart of the system is a programmable digital processor with a ROM containing a permanently stored instruction set and a RAM which stores coded instructions being processed by the digital processor. Coded instructions are entered through a keyboard data entry means having a plurality of keys. A temperature sensing means senses the ambient temperature of the heated and/or cooled space; an analog to digital converter transforms the analog temperature indication to a digital indication and transmits a digital signal indicative thereof to the digital processor. The digital processor responds to the digital signal and to the coded instructions stored in the RAM to selectively gate a controllable switch means such as a triac, which activates and/or deactivates the fan, heating and cooling systems in response thereto in dependence upon the state of a plurality of mode switches, thereby controlling the temperature of the indoor area in a sequence dictated by the instruction set permanently stored in the ROM. The thermostat system is programmable to automatically maintain ambient temperatures desired during selected time periods. It is programmable for automatic shutdown or setback during periods when the heated and/or cooled space is unoccupied or when activity therein is minimal such as during sleeping hours. It is also operatable in a manual mode to maintain a particular temperature setting continuously. The system also includes a 60 Hz oscillator for timekeeping functions.

In a preferred embodiment, the thermostat system contains an LED display comprising four digits for displaying desired parameters of time and temperature and characters for displaying the days of the week and morning/afternoon. The temperature sensing means includes at least one sensistor means, the electrical resistance of which varies with the ambient temperature. A plurality of sensitors may be utilized to monitor the temperature at a number of locations including outdoors to provide a remote temperature sensing capability. As a further feature, the ROM is programmed to allow the heating and cooling systems to remain in their present states of deactivation or activation for at least one minute before they are again activated or deactivated by the digital processor. The ROM is also programmed to measure the actual time rate of change of the temperature during both heating and cooling cycles to adapt the digital processor to anticipate reaching the desired temperature and prevent overshooting thereof.

In another embodiment, the digital processor comprises a single chip digital processor of the type heretofore generally used for calculator type operations. To enable a single chip to be used, the keyboard data entry means, display and temperature sensing means are connected to common output terminals of the digital processor and are scanned simultaneously therefrom to minimize the number of electrical connections required for control. A unique silicon spreading resistor is employed as a temperature sensor, thereby enabling larger resistances to be obtained with a low cost, thin planar configuration. As an additional feature, a backup bimetallic temperature sensing element is included in the event of failure of the main temperature monitoring system. The bimetallic sensor is set to activate the heating system when the temperature drops below a selected threshold level such as 40° F. A battery power supply is also included as a backup to supply DC power to the digital processor in the event of failure of the system power supply, thus enabling the digital processor to retain the information programmed therein and to continue timekeeping operations.

BRIEF DESCRIPTION OF THE DRAWINGS

Still further objects and advantages of the invention will be apparent from the detailed description and claims when read in conjunction with the accompanying drawings wherein:

FIG. 10*a* shows an example of a thermostat system with multiple sensor inputs; FIG. 10*b* shows a series of key switches and a slideable more switch for selecting one of a number of sensor inputs; FIG. 10*c* shows an automatic sensor monitoring system; and FIG. 10*d* shows an automatic sensor monitoring system including a humidifier control;

DETAILED DESCRIPTION OF A FIRST EMBODIMENT

Figure 1:
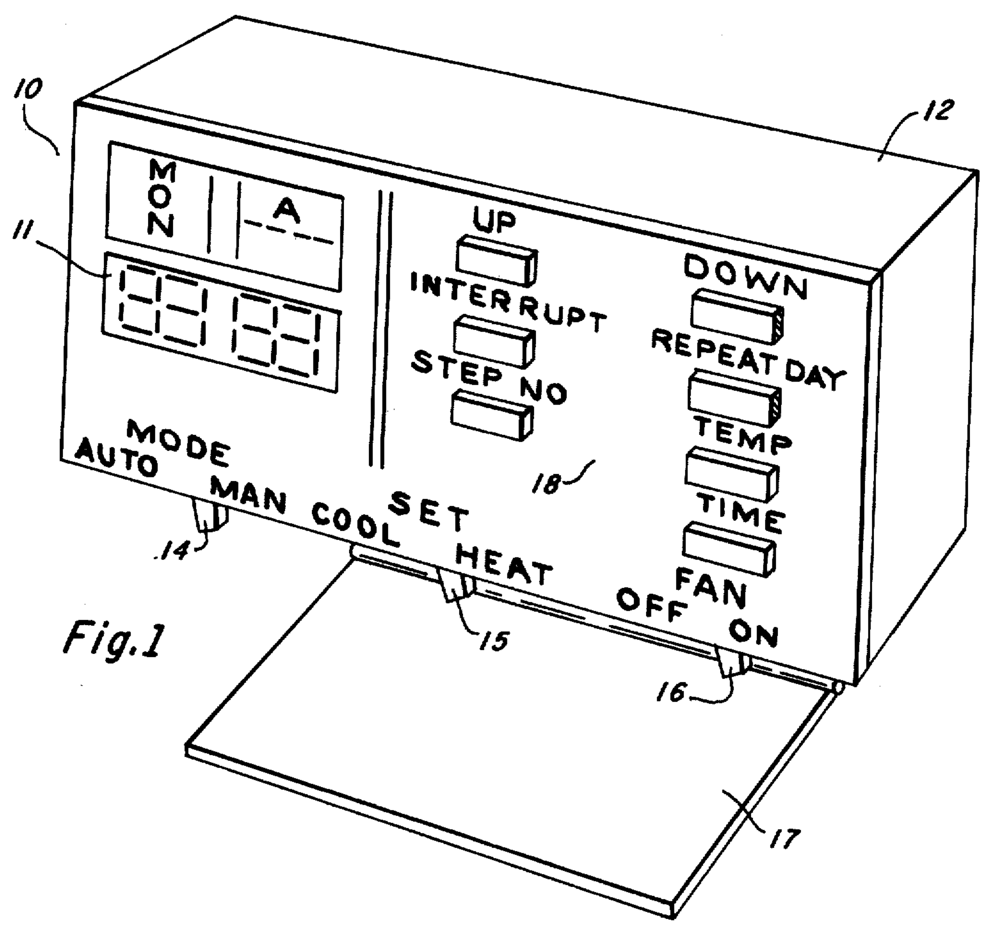
FIG. 1 is a perspective view of a first embodiment of a thermostat system in accordance with the present invention.

FIG. 1 illustrates one preferred embodiment of thermostat 10 having a box-shaped housing 12. Display 11 is an LED display which comprises four digits for displaying time and temperature parameters and backlighted indications for the day of the week and morning/afternoon (A/P). In the present embodiment, the four digit display is not continuous; the display is manually activated by pressing the TEMP keys and/or the TIME keys to display actual and programmed times and temperatures. Once activated, display 11 remains on for a selected length of time, typically 15 seconds. Mode switches 14, 15 and 16 are manually settable for thermostat 10 to operate in the automatic or manual mode, the cool or heat mode and the fan on continuous or fan automatic mode, respectively. Door 17, which is shown in an open position, covers keyboard 18, during normal operation. Access to keyboard 18 is easily achieved by opening door 17, which is hingedly attached to housing 12. Keyboard 18 comprises a plurality of keyswitches for setting time and temperature functions including means for programming thermostat 10 for automatic operation during selected time cycles.

Figure 2:
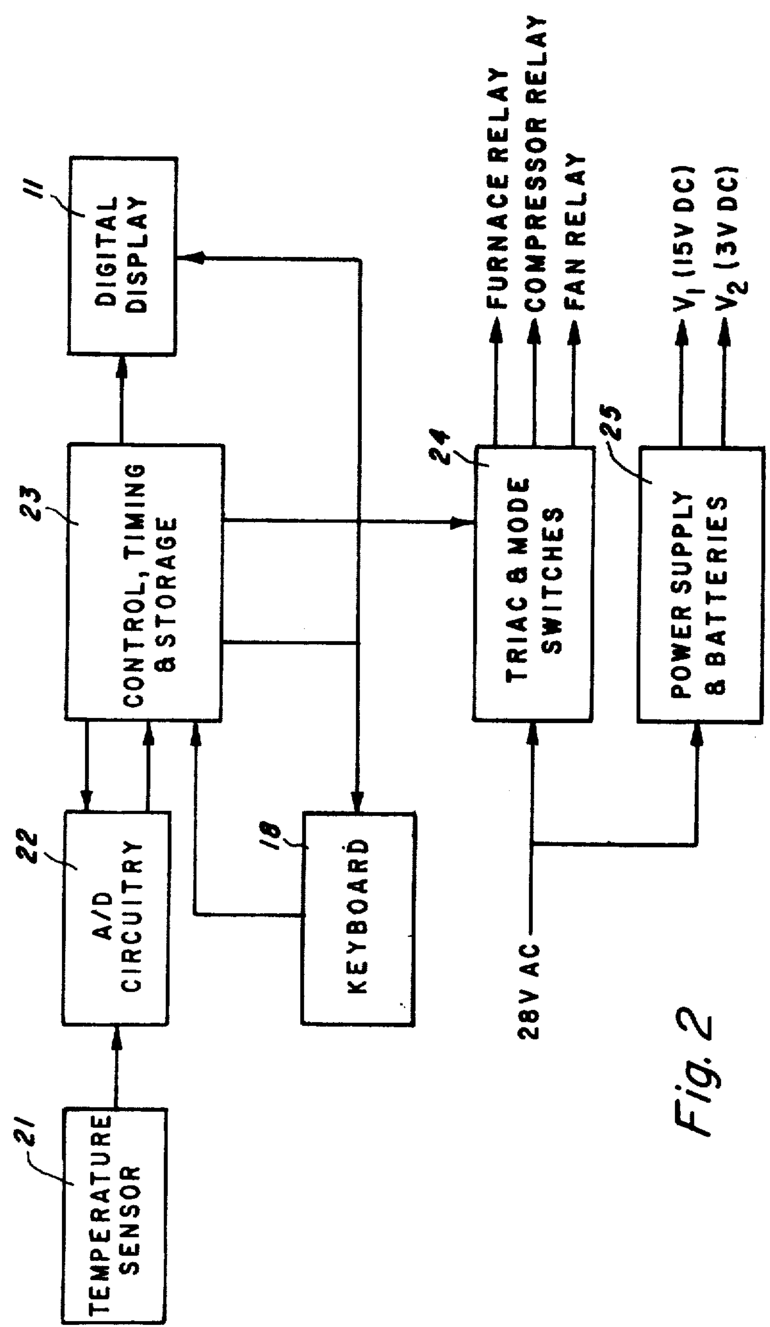
FIG. 2 is a block diagram of the thermostat control system and power supply.

Referring now to FIG. 2, a block diagram of the thermostat system is illustrated. A temperature sensor such as a sensistor 21, the electrical resistance of which varies linearly with temperature, senses the ambient temperature of the area in which temperature is being controlled. Responsive to temperature sensor 21, analog to digital (A/D) converter 22 continually sends digital coded indications of temperature to digital processor 23 when interrogated by processor 23. Processor 23 performs control, timekeeping and information storage functions and is programmable for desired temperatures and selected times via inputs from keyboard 18.

In accordance with its permanently stored program instruction set, processor 23 selectively activates switching circuit 24, which includes a triac and mode switches 15 and 16 shown in FIG. 1. When activated, the triac drives AC voltage to the air conditioning relay, furnace relay and fan relay in dependence upon the state of mode switches 15 and 16, thereby controlling heating and cooling to maintain the desired temperature. Rectifying power supply means 25 receives an AC input and provides DC voltage $V_1$ to operate digital processor 23 and DC voltage $V_2$ to drive display 11. Processor 23 selectively scans keyboard 18 and display 11 and activates display 11 to display selected parameters of time and temperature in accordance with coded instructions from keyboard 18.

Figure 3:
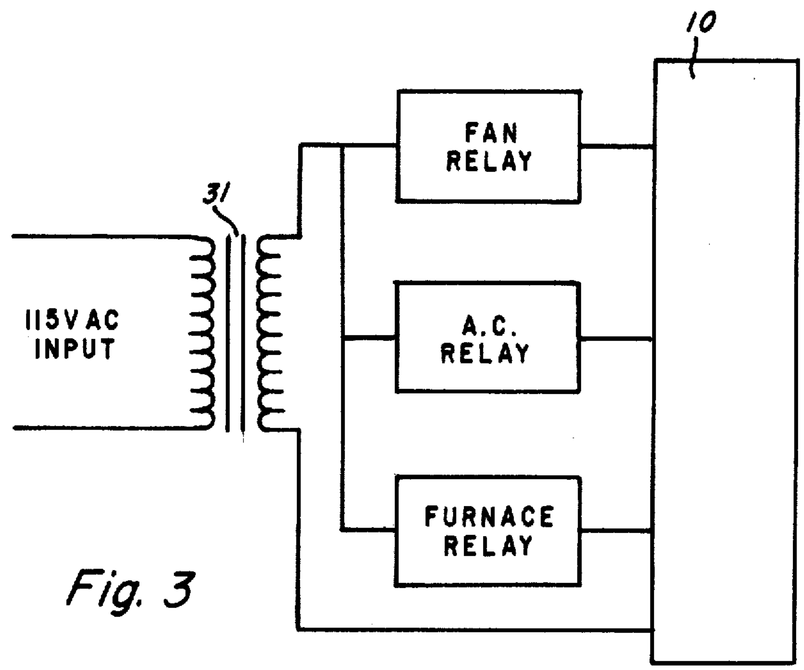
FIG. 3 is a circuit diagram showing the connection of the thermostat system to an AC power source.

FIG. 3 shows thermostat 10 connected to the 4-wire heating, air conditioning, fan and AC power supply connection wires commonly provided for home heating and air conditioning systems. Step-down transformer 31 reduces the AC line voltage to approximately 28 VAC. Thus thermostat 10 is directly substituteable for the standard electromechanical thermostat without the need for additional connection circuitry.

Figure 4A:
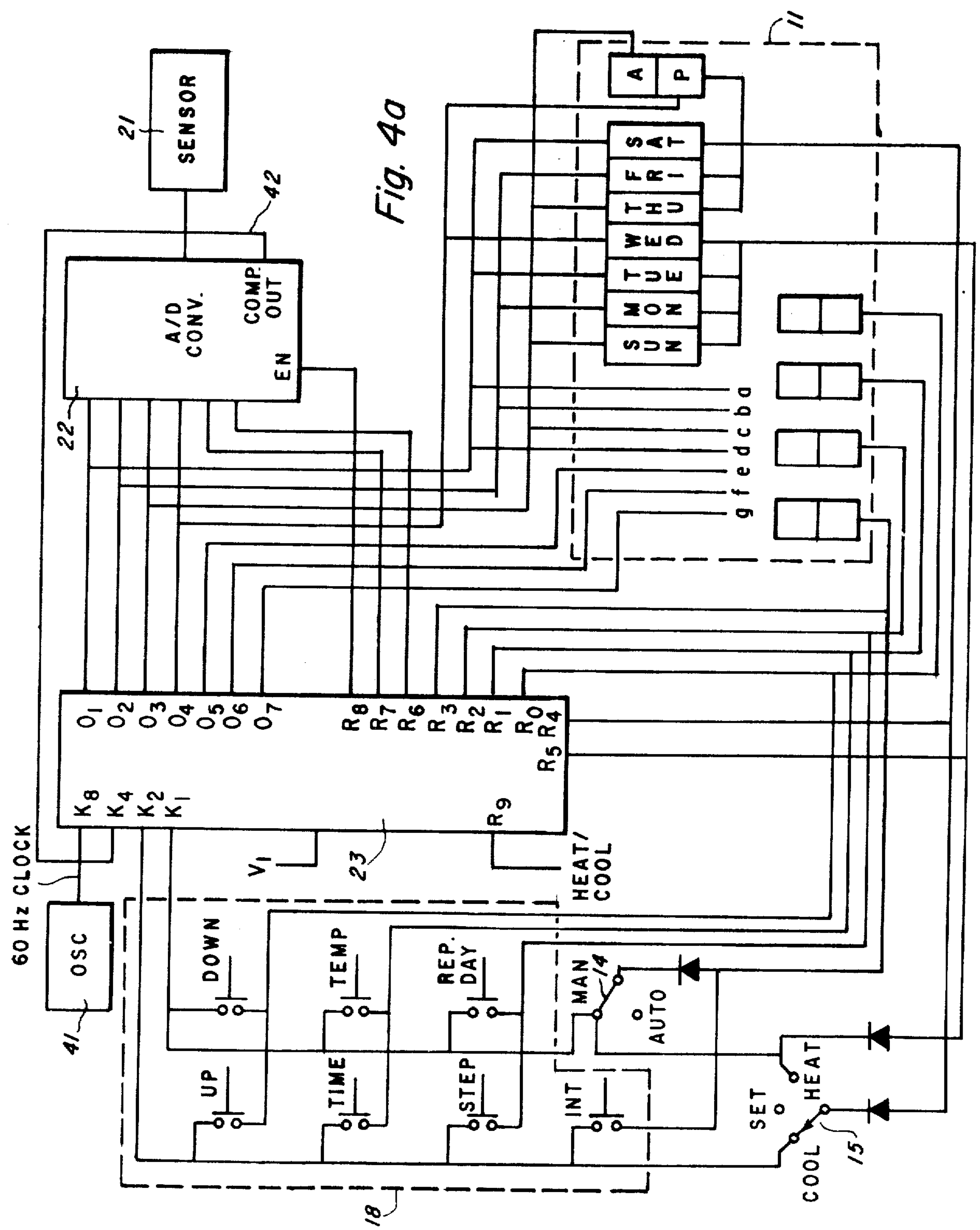
FIG. 4*a* is a circuit diagram of the thermostat control system embodied in the thermostat of FIG. 1.
Figure 4B:
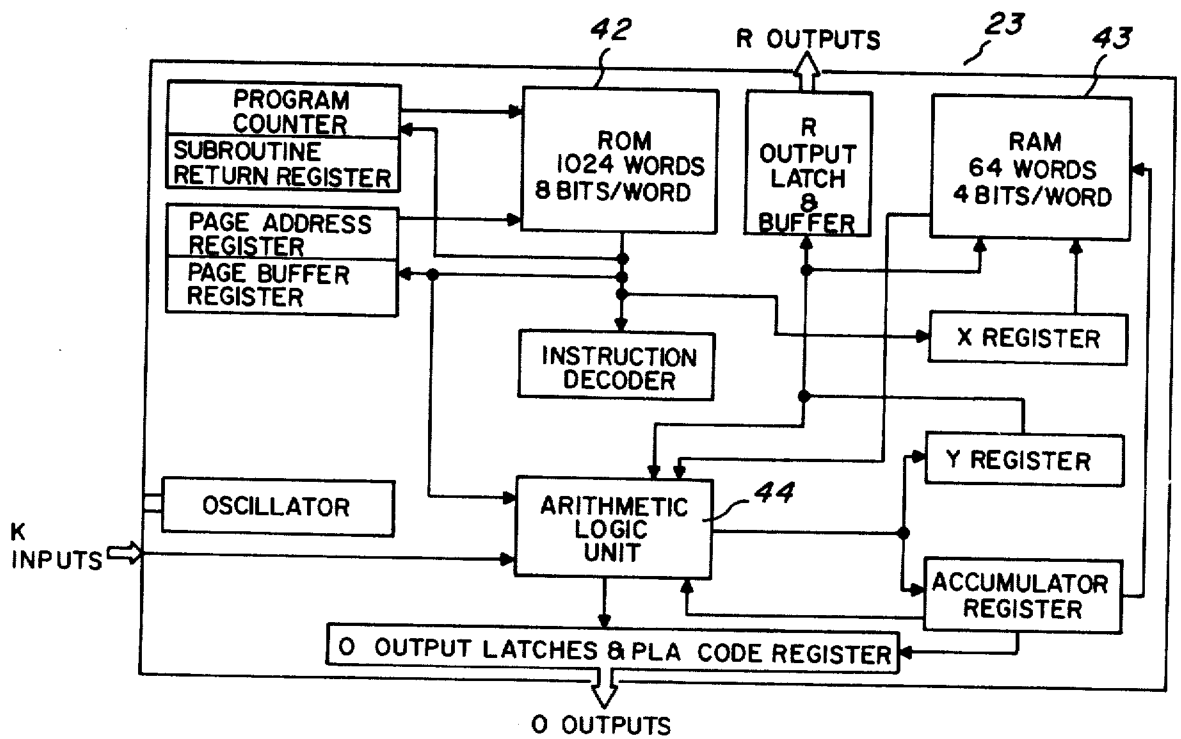
FIG. 4*b* is a block diagram of the TMS1100 digital processor.

FIG. 4*a* is a circuit diagram of the thermostat control system contained within housing 12. The heart of the system is digital processor 23 which includes a microprocessor, preferably a single chip semiconductor digital processor of the TMS1100 microcomputer type, which is manufactured and sold as a standard product by Texas Instruments Incorporated. Referring also to FIG. 4*b*, digital processor 23 includes a ROM 42 in which is permanently stored a full instruction set for controlling the sequence of operations of thermostat 10, a RAM 43 for storing coded information while the information is being processed, and an arithmetic logic unit 44 for performing arithmetic and logic operations. The TMS1100 includes the ROM, RAM and ALU on the single semiconductor chip. The instruction codes stored in the ROM of digital processor 23 are shown in Table I.

ROM 42 is programmed to measure the actual time rate of change of the temperature during both heating and cooling cycles to anticipate reaching the desired ambient temperature and prevent energy-wasting overshooting of the desired temperature as is common with present thermostats. This eliminates the need for anticipation cooling and heating resistors, which exert a temperature bias on the system, but may cause the system to maintain the temperature uncomfortably low or high during non-typical weather conditions. Also programmed in on-chip ROM 42 is a known delay time period such that digital processor 23 will not change the state of (i.e. activate or deactivate) the heating and/or cooling systems until they have remained in their present states of deactivation or activation for at least the delay time period, which is typically 1 minute in duration. This feature eliminates rapid cycling of the heating and cooling systems and prolongs system life. A hysteresis feature is built in to give the system some leeway in maintaining the desired temperature and to prevent the system from reacting unnecessarily to small changes of ambient temperature, thus conserving precious energy.

Coded temperature and time information is entered into digital processor 23 and stored in a plurality of registers in RAM 43 via the key switches of keyboard 18. By pressing selected key switches, desired temperatures and selected times of a time cycle are stored in digital processor 23 thereby programming digital processor 23 for temperature control in the automatic mode. Digital processor 23 automatically controls the heating and cooling systems to maintain the desired temperatures in accordance with the time sequence programmed therein. Alternatively, the system is operable in a manual mode wherein digital processor 23 will continuously maintain a particular temperature that is programmed in until it receives further instructions.

Referring to FIG. 4*a*, digital processor 23 controls the operation of the system by transmitting electrical signals via output terminals R0–R9 and 01–07 and receiving input signals via input terminals K1 and K2. Digital processor 23 also has a 60 Hz clocking signal applied to inut terminal K8 from oscillator 41 to keep track of real time and a DC input of approximately 15 volts. Display 11 and keyboard 18 (both of which are delineated by dotted lines) and A/D converter 22 are selectively controlled and scanned from common output terminals of digital processor 23 to minimize the number of electrical connections necessary and permit the use of a single semiconductor chip. Output terminals R0–R3 selectively scan the four digits of display 11 in sequence and output terminals 01–07 activate selected ones of segments a through g on each digit in accordance with the scanned sequence. Output terminals R0–R8 also scan the keyswitches of keyboard 18 and mode switch 14 and input signals indicative of the positions of these switches are received via input terminals K1 and K2. Similarly, output terminals R4 and R5 scan mode switch 15 and the day of the week and morning-/afternoon (A/P) indications of display 11. Output terminals 01–04 activate the days of the week and A/P displays in accordance with the scanned sequence. Output terminals R6 and R7 and 01–04 scan A/D converter 22, which is enabled by a signal via output terminal R8. A/D converter 22 is not continuously activated because the heat buildup within temperature sensor 21 would result in false temperature readings.

A/D converter 22 includes a resistance bridge (not shown) and a comparator (not shown) which compares the voltages on each side of the bridge and transmits an output signal 42 when the bridge becomes balanced to input terminal K4 of digital processor 23. The bridge includes temperature sensor 21 and a resistance ladder having resistors whose resistance values are binary coded. These resistors are selectively switched on by digital processor 23 in a sequence corresponding to binary coded 1° F. step increments in the ambient temperature until the bridge is balanced, whereupon comparator output 42 changes state (i.e. changes from a logic "1" to "0" or vice versa) thereby informing digital processor 23 that the ambient temperature as measured by temperature sensor 21 has been reached. Digital processor 23 compares the ambient temperature and real time with the coded time and temperature instructions stored in RAM 43 and controls the heating and cooling systems to maintain the desired ambient temperatures in accordance with the stored instructions.

Figure 5:
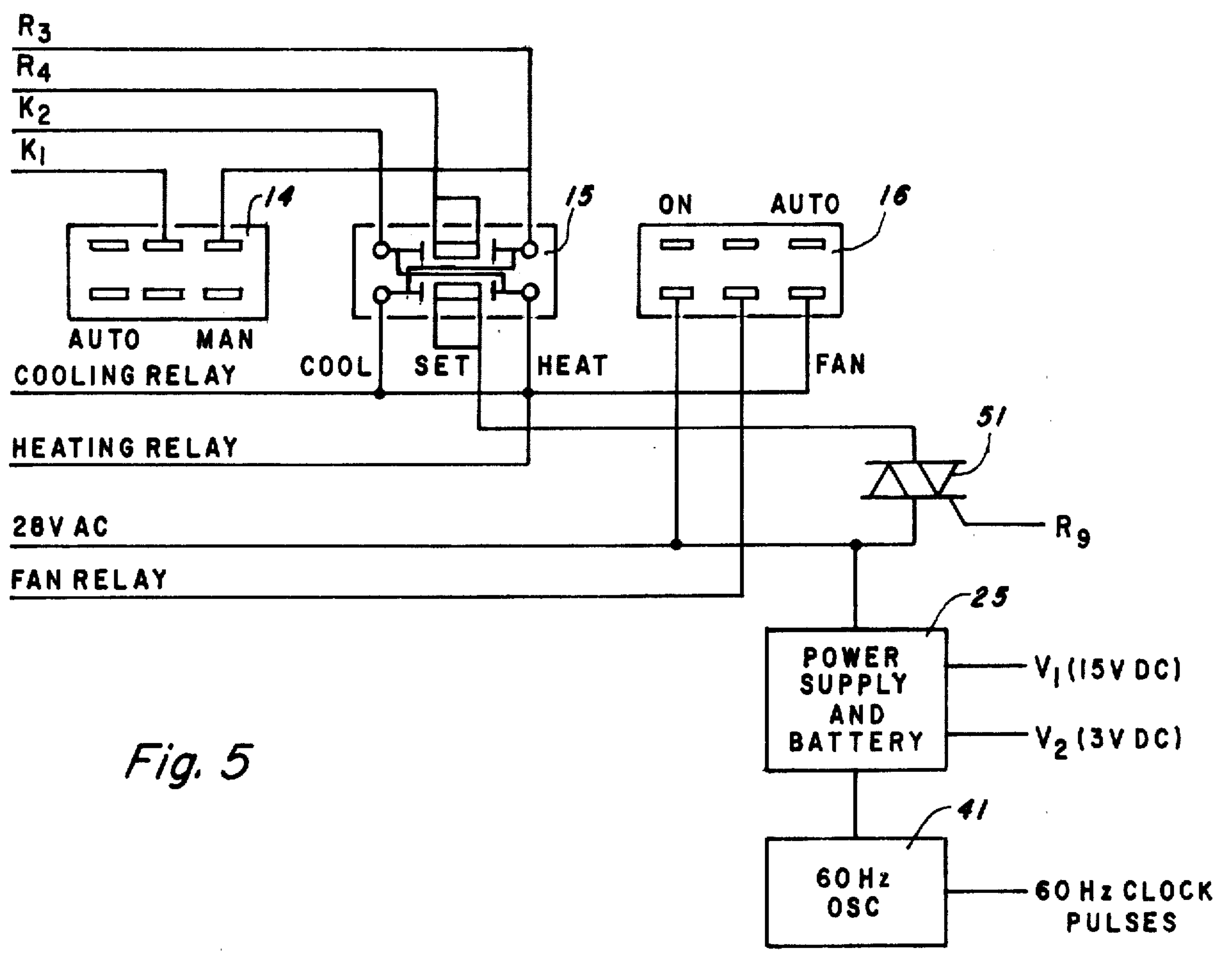
FIG. 5 is a circuit diagram of the heating, cooling and fan relay systems and the thermostat switches.

Digital processor 23 controls the activation of triac 51, shown in FIG. 5. To activate the heating and/or cooling systems, a gating signal via output terminal R9 turns on triac 51, which drives AC current to the fan, air conditioning and/or heating relays in dependence upon the state of mode switches 14, 15, and 16. Mode switches 14, 15 and 16 are, for example, double pole multiple throw slide switches, which are manually settable. Fan switch 16 is settable in the ON or AUTO positions. If fan switch 16 is set in the ON position, AC current bypasses triac 51 and goes directly to the fan relay thereby activating the fan continuously regardless of whether the heating or cooling system is activated. If fan switch 16 is in the AUTO position, the fan will be automatically activated in synchronism with the heating and/or cooling systems. For example, if mode switch 15 is in the COOL position, triac 51, when triggered by digital processor 23, drives AC current to the fan and air conditioning relays. Similarly, mode switches 14 and 15 are settable to operate in an automatic or manual mode and in a cooling or heating mode, respectively. The SET position of switch 15 repesents the off position and permits the system to be user programmed. Digital processor 23 determines the positions of switches 14 and 15 by scanning the switches from output terminals R3 and R4 and receiving information on input terminals K1 and K2.

As previously mentioned, the standard 4-wire thermostat connection is utilized to facilitate installation. To enable the 4-wire connection scheme to be used, the heating relay and cooling relay wires are connected so that a small trickle current, which is insufficient to activate either system, flows through the heating relay when mode switch 15 is in the COOL position and flows through the cooling relay when mode switch 15 is in the heat position. The thermostat system power supply receives AC voltage from the 28 volt AC supply and reduces and rectifies the voltage to provide a DC voltage input $V_1$ of approximately 15 volts for the TMS1100 microcomputer comprising digital processor 23 and a DC voltage $V_2$ of approximately 3 volts to drive LED display 11. Power supply means 25 also supplies power to oscillator 41 which is synchronized with the 60 Hz AC line input to provide 60 Hz clock pulses to digital processor 23. Power supply means 25 further includes a battery which functions as a backup power supply for digital processor 23 in the event of failure of the main system power supply. Power supplied from the battery enables digital processor 23 to retain any user supplied information programmed therein and to continue keeping real time.

MODE OF OPERATION OF FIRST EMBODIMENT

Referring again to FIG. 1, the present embodiment of thermostat 10 is programmable via keyboard 18 for up to 15 separate user program instructions during a seven day time cycle. Each program instruction represents a specific temperature desired during a specific time period. For example, thermostat 10 is programmable for automatic temperature setback during periods when the heated and/or cooled space is unoccupied such as during daily working hours on weekdays and during nighttime sleeping hours. Thermostat 10 may also be programmed to bring the ambient temperature back up to a comfortable level when one arrives back home after work or when one rises in the morning. The seven day cycle feature enables a full week of user programmed instructions to be stored in the memory of thermostat 10. The user program will be executed week after week until altered for such as vacations. Different temperature instructions may be stored for different days of the week. For example, on weekends one may wish to keep his home at a comfortable temperature all day long because he will be home all day rather than at a lower or higher temperature which may be acceptable during weekday periods when the home is unoccupied.

To operate thermostat 10, the clock should first be set by moving mode switch 15 to the SET position, which corresponds to the off position of the heating and cooling systems, and mode switch 14 to the MANUAL position. The TIME key on keyboard 18 is then depressed and display 11 is set to the correct day of the week and morning or afternoon using slew keys UP and DOWN. Alternatively, a numerical keyboard is substituteble for the slew keys. The TIME key is depressed a second and a third time and the above procedures are repeated to set in the correct hours and minutes, respectively. To start the clock, mode switch 15 is returned to either the HEAT or COOL position.

To operate thermostat 10 in a manual mode, mode switch 15 is moved to the SET position and mode switch 14 to the MANUAL position. The set and actual temperatures will be displayed. The desired temperature is then entered using slew keys UP and DOWN and mode switch 15 is returned to the HEAT or COOL position as desired. Referring to FIGS. 4a and 5, digital processor 23 will selectively switch on triac 51 to activate the heating and/or cooling systems to maintain the desired temperature.

To program thermostat 10 for automatic operation, mode switch 15 is moved to the SET position and mode switch 14 to the AUTO position. Display 11 will show number 1, indicating step or program number 1. The TIME key is depressed three times in sequence to enter the day of the week, morning or afternoon and hours and minutes as previously described. The TEMP button is then pressed and the desired temperature entered. To enter additional programs, the STEP key is pressed and the above procedure repeated. Each time and temperature instruction represents the time at which thermostat 10 is programmed to change the ambient temperature to the respective desired temperature. A total of 15 steps may be entered during a seven day cycle. To repeat a previous day's program, the TIME key is pushed and the new day is entered; then the RPT key is depressed. Upon completion of programming, the END key is pushed. To begin operation, mode switch 15 is moved to the HEAT or COOL position and system operation will commence after a one minute delay period. Digital processor 23 will automatically control heating and/or cooling operations to maintain desired temperatures in accordance with the sequence programmed therein. In order to conserve power in the present LED embodiment, display 11 does not remain on during normal system operation. If readout of the actual time and/or temperature is desired at any time, the TIME and/or TEMP keys are pushed and display 11 will show the actual time and/or temperature. A further feature of the invention enables the user to temporarily interrupt automatic operation without having to reprogram thermostat 10. To accomplish this temporary interruption, mode switch 15 is moved to the SET position and the INTERRUPT key is pushed. The TIME and TEMP keys are pressed to enter the desired duration of interruption in hours and the desired temperature. Mode switch 15 is then returned to the HEAT and COOL position and digital processor 23 will maintain the desired temperature during the period of interruption and then return automatically to the programmed sequence at the conclusion of this period.

DESCRIPTION OF A SECOND EMBODIMENT

Figure 6:
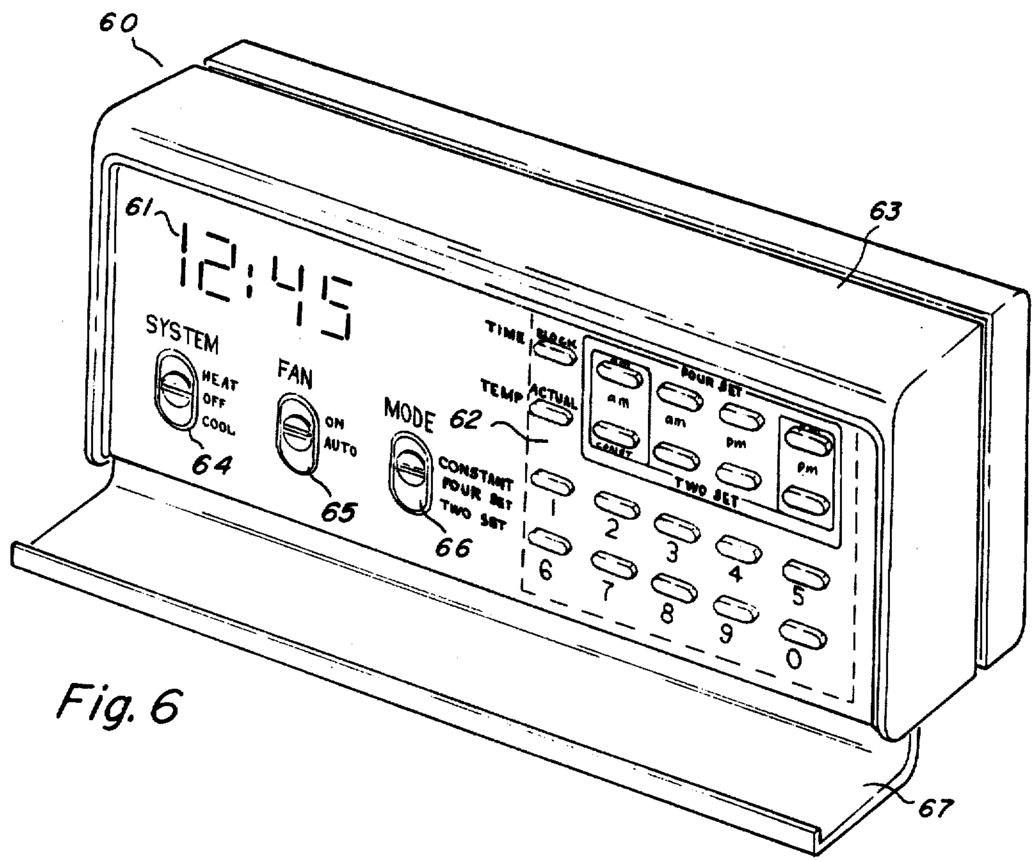
FIG. 6 is a perspective view of a second embodiment of a thermostat system in accordance with the present invention.

FIG. 6 shows a perspective of a second embodiment of a thermostat 60 having a box-shaped housing 63. Display 61 comprises a four digit LED display. Keyboard 62, delineated by dotted lines, contains 10 number keys for entering digital information and a plurality of TIME and TEMP keys.

The far left TIME and TEMP keys are used to set in and display clock time and actual temperature. The four TIME and TEMP keys to the right are used to program thermostat 60 for automatic operation.

Mode switches 64, 65 and 66 are manually settable for thermostat 60 to operate in a cool or heat mode, a fan on or fan automatic mode, and an automatic or constant mode, respectively. During normal operation, a door 67 is hingedly attached to the bottom of thermostat 60 to cover mode switches 64, 65 and 66 and the 10 number keys of keyboard 62.

Figure 7:
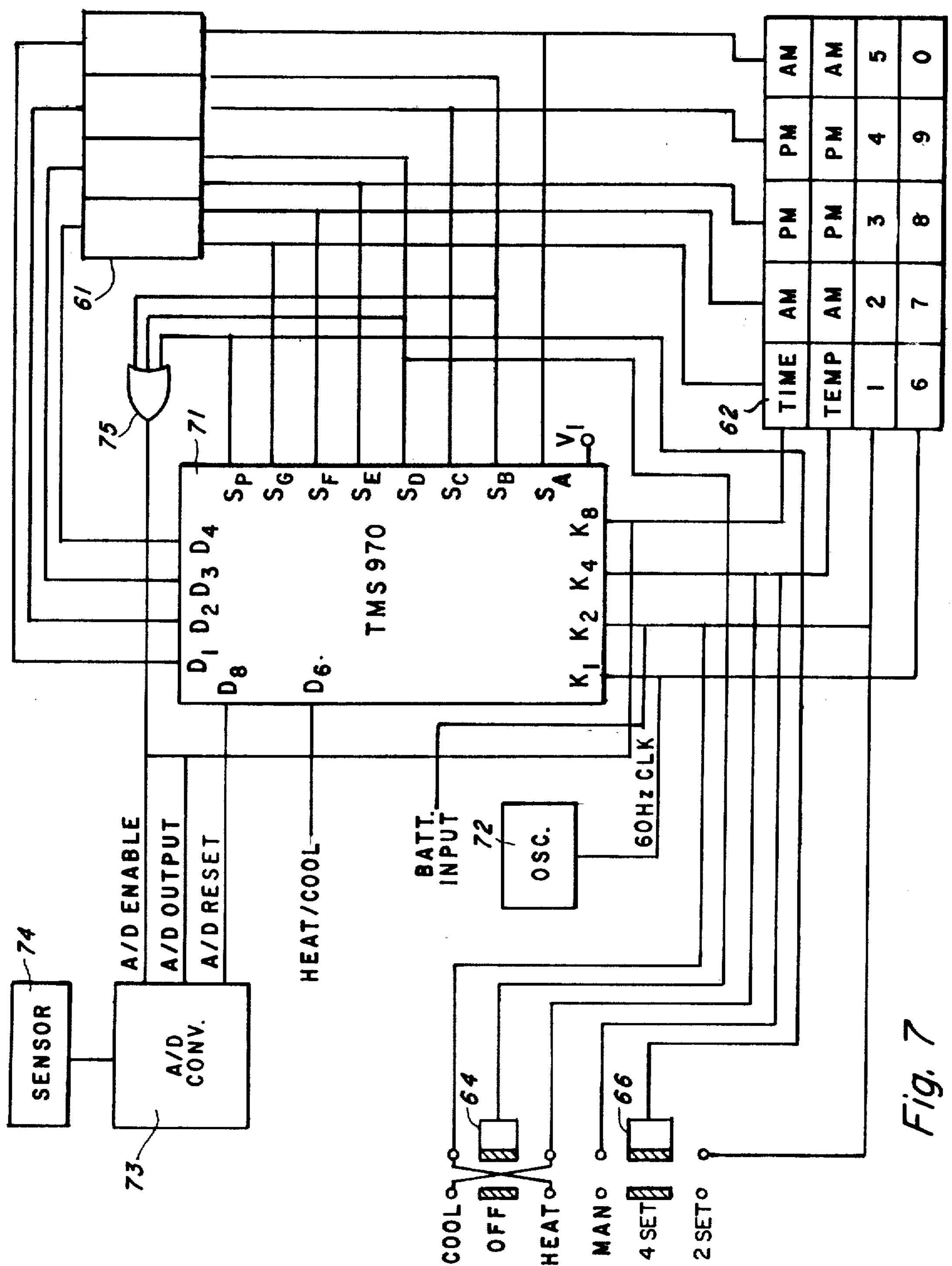
FIG. 7 is a circuit diagram of the thermostat control system embodied in the thermostat of FIG. 6.

FIG. 7 shows a circuit diagram of the control system contained within housing 63. The heart of the system is digital processor 71, comprised of a microprocessor with ROM and RAM preferably contained on a single semiconductor chip such as the digital processor TMS970 microcomputer generally used for calculator type operations, which is manufactured and sold as a standard product by Texas Instruments Incorporated. Digital processor 71 has a ROM in which is permanently stored an instruction sequence for controlling the operation of thermostat 60, a RAM for storing coded information while the information is being processed and an arithmetic/logic unit for performing logic operations in an arrangement substantially similar to that shown in FIG. 4*b*. The ROM instruction codes are listed in Table II. The ROM is programmed for a known delay period such that digital processor 71 will not change the state (i.e. activate or deactivate) the heating and/or cooling systems until they have remained in their present states of deactivation or activation for at least the delay time period, which is typically 3 minutes in duration. This delay time function prevents wasteful cycling of the heating and cooling systems and prolongs system life.

Figure 8:
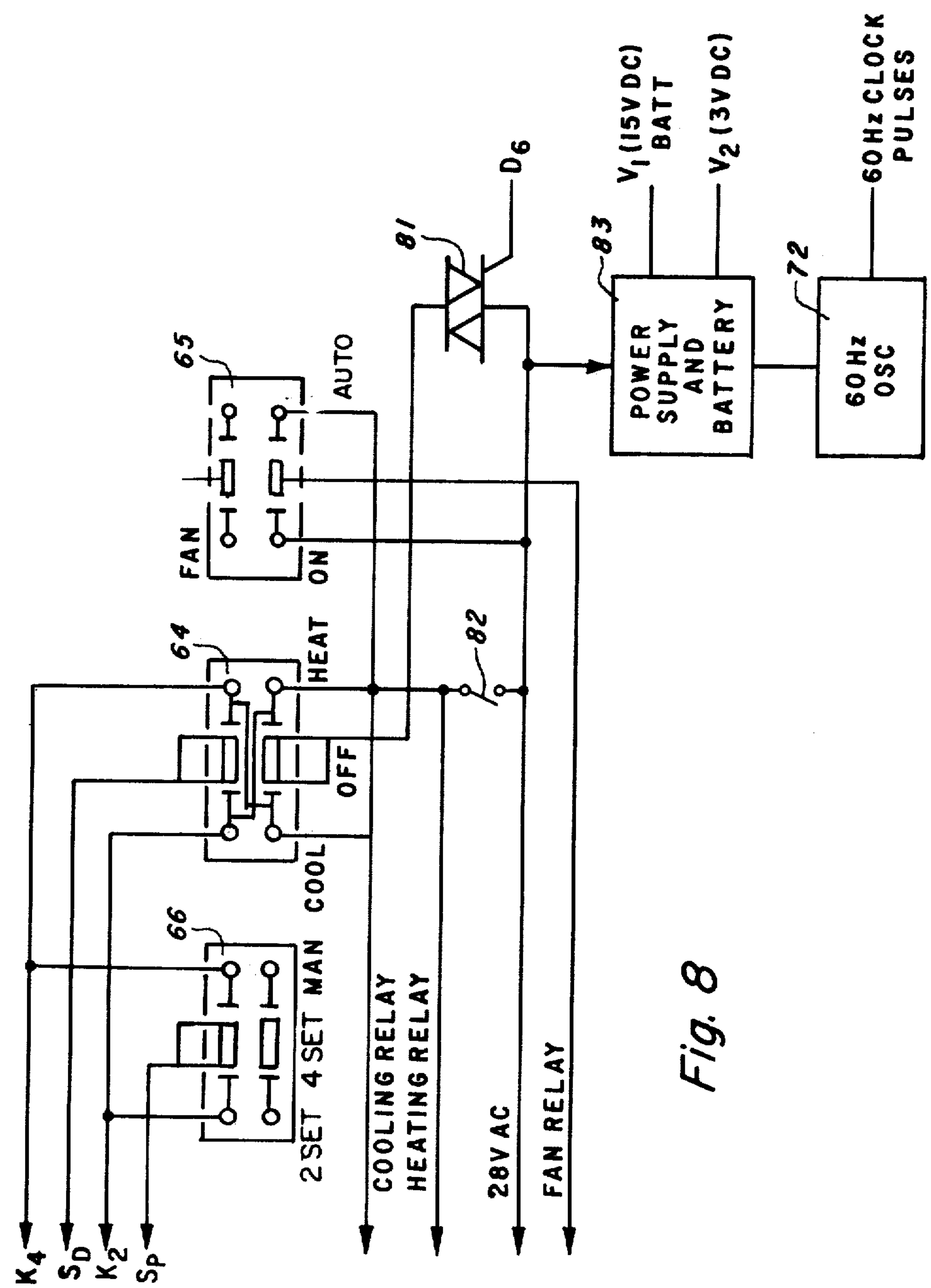
FIG. 8 is a circuit diagram of the heating, cooling and fan relay systems and the thermostat mode switches for the thermostat of FIG. 6.

Coded time and temperature information are entered into digital processor 71 and stored in the RAM via the keyswitches of keyboard 62. Desired temperatures and selected times of a time cycle are entered in digital processor 71, thereby programming it for automatic operation. Digital processor 71 automatically controls the operation of the heating and cooling systems to maintain the desired temperatures in accordance with the programmed time sequences. It selectively transmits electrical signals in sequence from output terminals D1–D4, D6, D8 and Sa–Sg and Sp and receives signals via input terminals K1, K2, K4, and K8. A 60 Hz oscillator 72 supplies 60 Hz clock pulses to digital processor 71 enabling digital processor 71 to keep track of real time. Digital processor 71 is supplied with a DC voltage input V1 from a power supply (FIG. 8). A backup battery power supply is available in the event the main power supply system fails. The backup battery power supply enables digital processor 71 to retain its stored programmed instructions and to continue timekeeping operations.

FIG. 7 shows display 61, keyboard 62 and A/D converter 73 being connected to common output terminals of digital processor 71. The number of electrical conductors and connections needed is minimized thus permitting a single semiconductor chip to be used. Output terminals Sa–Sg selectively scan the seven segments on each display digit in sequence and output terminals D1–D4 activate the four digits in accordance with the scanned sequence. Terminals Sa, Sc, Se, Sf and Sg also scan the keyswitches of keyboard 62 and digital processor 71 receives input signals indicative of the positions of the keyswitches via input terminals K1, K2, K4 and K8. Mode switches 64 and 66 are scanned by output terminals Sd and Sp, respectively, with input signals indicative of the positions of these switches received via input terminals K2 and K4.

A/D converter 73 is selectively enabled by the output of OR gate 75, which receives inputs from output terminals Sb, Sd and Sp. Output terminals D8 resets A/D converter 73 after a digital signal output indicative of the ambient temperature has been transmitted to input terminal K8. Temperature sensor 74 comprises a silicon spreading resistor whose electrical resistance varies with the ambient temperature. The use of a silicon spreading resistor enables large resistances to be obtained with a low cost, planar resistor configuration. Digital processor 71 monitors A/D converter 73 in a manner similar to that described with respect to digital processor 23 in the first embodiment. Digital processor 71 receives a digital signal indicative of the ambient temperature and compares it and the real time with the desired temperatures and selected times programmed therein. Digital processor 71 controls the heating and cooling system to maintain the desired temperatures in accordance with the programmed time sequence.

Digital processor 71 controls a switching means such as triac 81 as shown in FIG. 8. When gated by a signal from terminal D6, triac 81 drives AC current to the fan, air conditioning and heating relays in dependence upon the state of mode switches 64, 65 and 66. Mode switches 64,65 and 66 are, for example, double pole multiple throw slide switches, which are manually settable. Mode switch 64 is set for cooling or heating; switch 65 is set for fan ON or fan AUTO mode. Switch 66 is set for constant operation, in which thermostat 60 maintains a particular temperature continuously, and for two modes of automatic operation, the two cycle (four set) and one cycle (two set). Digital processor 71 scans the positions of switches 64 and 66 from output terminals Sd and Sp and receives input signals at terminals K2 and K4.

To enable the standard 4-wire therostat connection scheme to be utilized, the cooling and heating relay wires are connected via terminals in mode switch 64 so that a small trickle current, which is insufficient to activate either system, flows through the heating relay when mode switch 64 is in the COOL position and through the cooling relay when switch 64 is in the HEAT position. As a safety backup feature in case of system failure, a conventional bimetallic temperature sensor 82 is connected to the heating relay to insure that the heating system is activated when the temperature drops to a threshold level, typically 40° F. Power supply means 83 receives AC voltage from the 28 volt AC supply and reduces and rectifies it to provide a DC voltage input V1 of approximately 15 volts for digital processor 71 and a DC voltage V2 of approximately 3 volts to drive LED display 61. Power supply means 83 also powers oscillator 72, which is synchronized with the 60 Hz AC line input.

MODE OF OPERATION OF A SECOND EMBODIMENT

Referring again to FIG. 6, therostat 60 may be programmed for various modes of operation by manually setting switches 64, 65 and 66 and entering coded temperature and time information into digital processor 71 using the keyswitches of keyboard 62.

To program thermostat 60, the time of day clock should first be set. The TIME key labeled clock is pressed and the correct time is entered using the numerical keyswitches. Then AM or PM is entered using the far left AM key and the far right PM key. To set in a temperature for the constant mode of operation, mode switch 66 is moved to the CONSTANT position. The TEMP key labeled CONST is pressed and the desired temperature is entered using the numerical keys.

To program thermostat 60 for one cycle automatic operation, mode switch 66 is placed in the two set position. The far left AM TIME key and the far left TEMP key are pressed; the time at which a temperature change is desired and the ambient temperature desired at that time are entered using the numerical keys. The above procedure is repeated after pressing the far right PM TIME key and far right TEMP key. Thus the one cycle mode of automatic operation allows for a maximum of two temperature changes during a daily time period. For example, one may program thermostat 60 for night setback operation such that the ambient temperature is lowered at bedtime and remains at a low level until wake up time, at which time thermostat 60 may be programmed to return the temperature to a more comfortable level.

Figure 9:
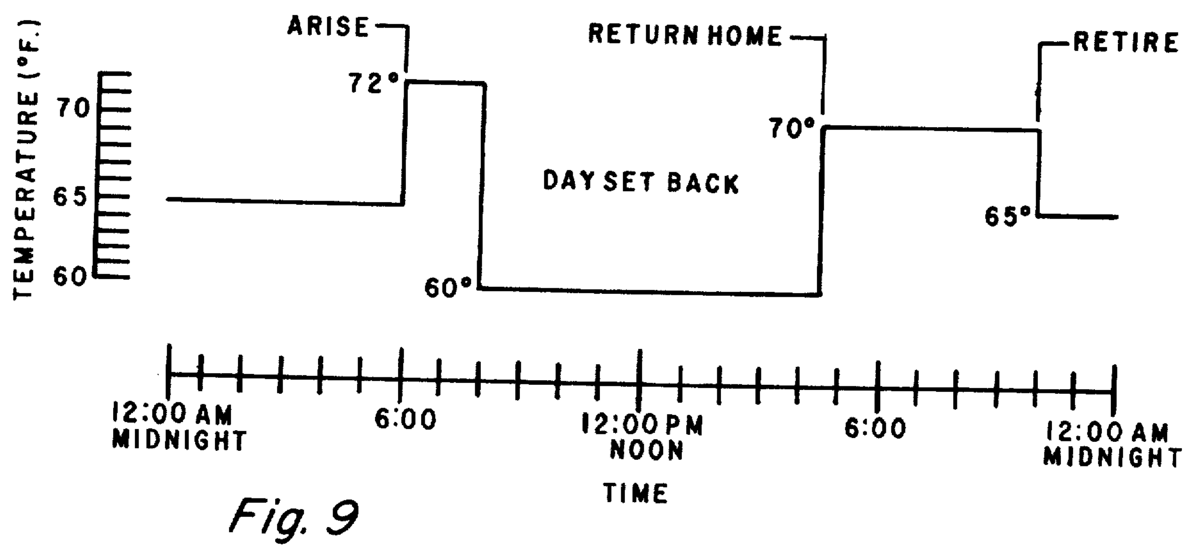
FIG. 9 is an illustration of an automatic temperature control sequence for a heating cycle.

Similarly, thermostat 60 is programmable for two cycle operation. Mode switch 66 is placed in the four set position. Beginning with the far left AM TIME key and TEMP key and proceeding through the far right PM TIME key and TEMP key, each of the four TIME and TEMP keys is pressed in sequence and four selected times and temperatures are entered using the numerical keys in the same manner as previously described. Thus a total of 4 times and temperatures may be programmed for two cycle operation. An example of two cycle operation for a heating cycle is shown in FIG. 9. Thermostat 60 is programmed for daytime setback to 60° F. from 8:00A.M.–4:30P.M., the temperature is set for 70° F. and a night setback temperature of 65° F. is programmed for 10:00P.M.–6:00A.M. At 6:00A.M., the temperature is set for 72° F.

Once programming is completed, mode switches 64, 65 and 66 are set for the desired operation. While thermostat 60 is in operation, actual and programmed times and temperatures are displayed by pressing the appropriate TIME and TEMP keys. Individual programmed instructions may be changed at any time without changing the entire program. The proper TIME key is pressed and the selected time entered using the numerical keyswitches. Similarly, temperature instructions are entered by pressing the proper TEMP key and entering the desired temperature using the numerical keyswitches. In addition, automatic operation of thermostat 60 is temporarily interrupted by setting mode switch 66 to CONSTANT and setting in a desired temperature. Thermostat 60 will continuously maintain this desired temperature until mode switch 66 is shifted from the CONSTANT position. Automatic operation is restored by changing mode switch 66 back to the four set or two set position.

Figure 10A:
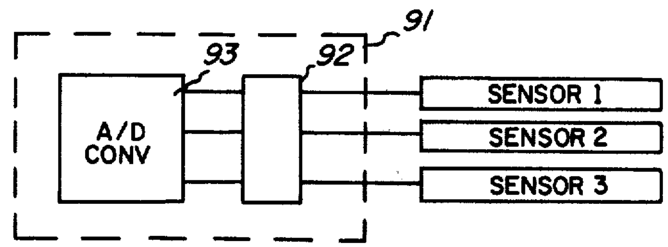
FIGS. 10*a*–10*d* is an illustration of how the thermostat system of the present invention receives inputs from multiple temperature and humidity sensors where
Figure 10B:
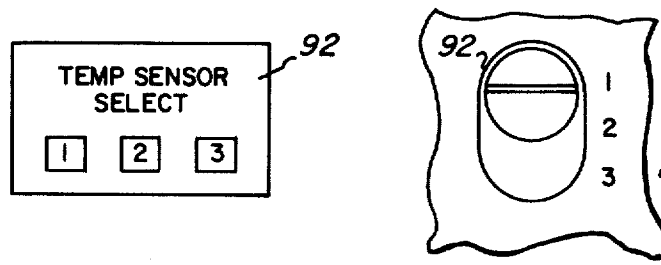

The thermostat systems herein described are adaptable to receive temperature and humidity inputs from a plurality of remote sensors as shown in FIGS. 10*a*–10*d*. FIG. 10*a* shows a thermostat system 91 of the present invention receiving inputs from multiple temperature sensors 1,2 and 3, each located in different areas indoors as well as outdoors. Thermostat 91 is equipped with a switch means 92 for manually selecting the particular sensor input to A/D converter 93. Switch means 92 is, for example, a series of keyswitches, each keyswitch for selecting one temperature sensor, or a slideable mode switch wherein each switch position corresponds to a particular sensor, as depicted in FIG. 10*b*. For example, if it is desired to display and/or monitor the temperature in the area where sensor 1 is located, one would press sensor select key 1 or slide mode switch 92 to the 1 position.

Figure 10C:
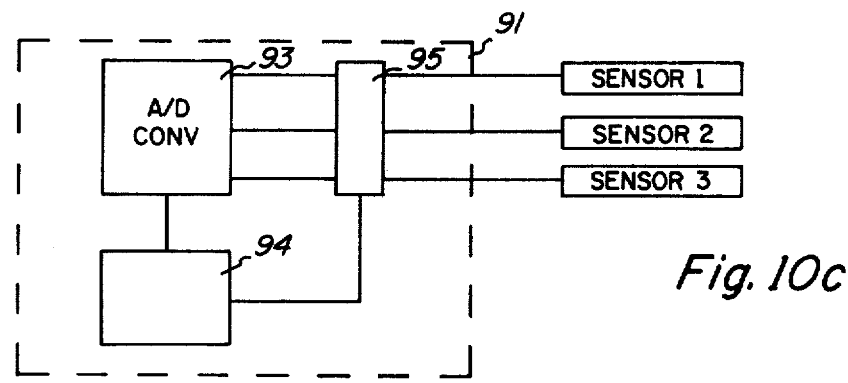

Alternatively, all of the temperature sensors are monitored automatically by digital processor 94 as shown in FIG. 10*c*. Using an analog multiplexing switch means 95, digital processor 94 is programmed to selectively switch in sensors 1,2 and 3 in sequence and to monitor the various temperatures at the locations of sensors 1, 2 and 3 in accordance therewith. Thus, thermostat system 91 is programmable to monitor and display temperatures at a plurality of locations in sequence. If one of temperature sensors 1, 2 and 3 is set up to measure the outdoor temperature, the user gets an indication of the indoor-outdoor temperature differential. This information is useful in choosing the desired indoor temperature and whether to use staged heating and/or cooling instead of normal heating and/or cooling.

Figure 10D:
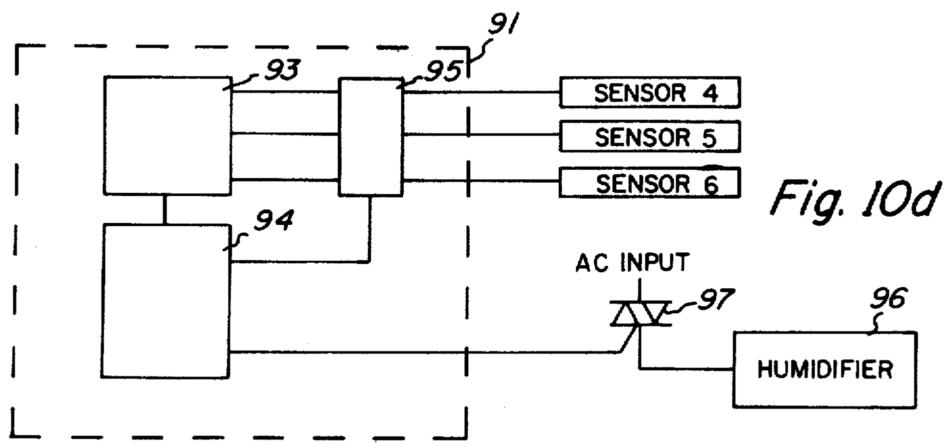

In addition, thermostat system 91 is adaptable to receive inputs from humidity sensors and is programmable to turn on a humidifier 96 when desired. As shown in FIG. 10*d*, digital processor 94 switches in sensors 4,5 and 6 in sequence via analog multiplexing switch 95 and receives a digital indication of the indoor and/or outdoor humidity from A/D converter 93. The humidity values at the locations of sensors 4,5 and 6 are monitored and displayed in a manner similar to that previously described with respect to temperature. If it is desired to activate humidifier 96, one manually selects the humidifier on position of a humidifier switch (not shown), which is, for example, a keyswitch or a slideable mode switch. An input signal is transmitted to digital processor 94, which gates triac 97 to turn on humidifier 96. To turn off humidifier 96, the humidifier off position is selected.

Figure 11:
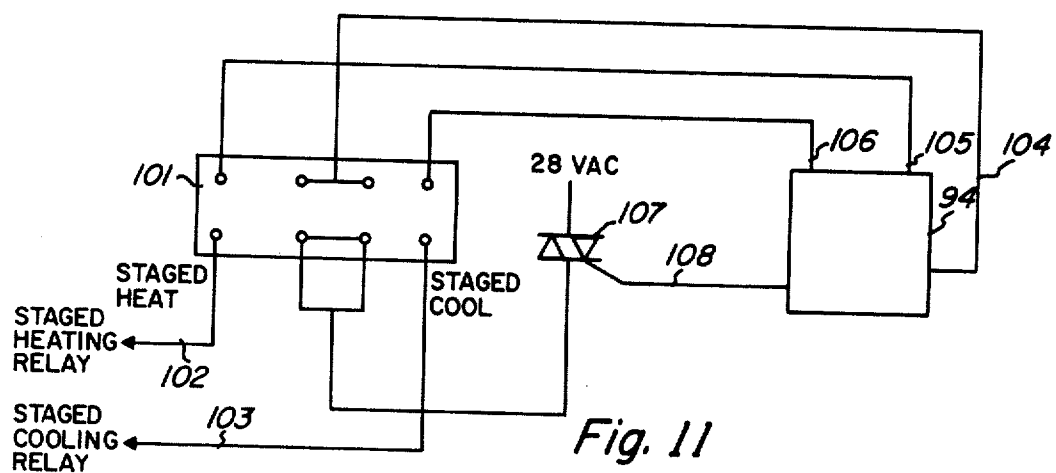
FIG. 11 is a diagram showing control of staged heating and cooling.

FIG. 11 shows how the thermostat system of the present invention is adaptable to control staged heating and cooling wherein the rates of heating and cooling an area are more gradual than normal heating and cooling. The thermostat system is equipped with a mode switch 101, which is manually settable for STAGED HEAT and/or STAGED COOL positions. Additional connection wires 102 and 103 are connected to staged heating and cooling relays, respectively to activate staged heating and cooling. Digital processor 94 determines the position of mode switch 101 by transmitting a signal via output terminal 104 and receiving input signals via input terminals 105 and 106 in dependence upon the state of mode switch 101. Digital processor 94 is programmed to control staged heating and cooling in a manner similar to that previously described with respect to normal heating and cooling. Digital processor 94 selectively gates triac 107 via output terminal 108 and triac 107 drives AC current to the staged heating and/or cooling relays. This results in the heating and/or cooling of an indoor area at a more gradual rate than under normal heating and cooling operation. Such slower rates may be desired when outdoor conditions are mild and the indoor-outdoor temperature difference is slight.

Figure 12:
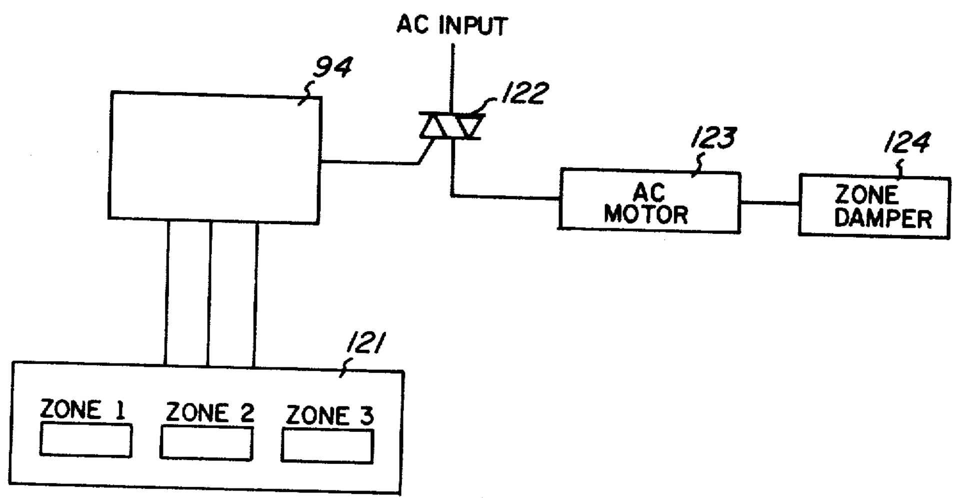
FIG. 12 is a diagram showing the thermostat system of the present invention controlling zone heating and cooling.

FIG. 12 illustrates how the thermostat system of the present invention is adaptable to control the supply of warm and cool air to different indoor zones. Digital processor 94, in response to programmed instructions entered therein from keyswitches 121, selectively activates triac 122 which drives AC current to AC motor 123 to open and close a damper 124 in the ventilation duct supplying warm and cool air to a particular zone. For example, if it is desired to cool zones 1 and 2, but not zone 3 because zone 3 is unoccupied, the respective keyswitch 121 corresponding to zone 3 is pressed, thereby sending an electrical signal to digital processor 94. Digital processor 94, in response thereto, turns on triac 122, which activates motor 123 to close damper 124, thereby shutting off the supply of cool air to zone 3. By pressing the same keyswitch 121 a second time, damper 124 is reopened, allowing cool air to flow to the zone 3 areas. Thus energy is conserved by regulating the supply of heated and cooled air to different indoor zones.

Various embodiments of the invention have now been described in detail. These embodiments provide automatic temperature control and energy savings and are inexpensive to produce. Since it is obvious that many additional changes and modifications can be made in the above-described details without departing from the nature and spirit of the invention, it is understood that the invention is not to be limited to said details except as set forth in the appended claims.

TI-6657

TABLE I

ROM CODE ASSEMBLY

| | | | | | | | | | | | | | | | | | | | | |
|---|---|---|---|---|---|---|---|---|---|---|---|---|---|---|---|---|---|---|---|---|
| 000 | 3E | 0 | MP1022 | 0060 | 0044 | 0035 | 0003 | 0049 | 0006 | 00A9 | 004C | 0060 | 0027 | 0003 | 00A6 | 0021 | 0044 | 0038 | 008C | 0000 |
| 011 | E1 | 0 | MP1022 | 0035 | 0061 | 0070 | 007A | 000F | 0040 | 0021 | 007A | 0044 | 007A | 0062 | 002C | 0026 | 0040 | 0079 | 0079 | 0038 |
| 022 | 8F | 0 | MP1022 | 0060 | 0085 | 0003 | 0044 | 0088 | 003E | 0062 | 006C | 0018 | 0019 | 005C | 0021 | 002C | 0035 | 0045 | 003A | 0031 |
| 033 | 93 | 0 | MP1022 | 0025 | 0065 | 0061 | 0021 | 0064 | 000F | 0045 | 0027 | 0044 | 0040 | 0027 | 0028 | 0027 | 0000 | 0025 | 0000 | 002A |
| 044 | 70 | 0 | MP1022 | 0049 | 000F | 003A | 0012 | 0092 | 000B | 0000 | 001B | 0021 | 00A6 | 0044 | 0084 | 0014 | 0044 | 002E | 0000 | 0000 |
| 055 | CE | 0 | MP1022 | 0010 | 0020 | 0015 | 0021 | 000C | 004C | 0013 | 002C | 0021 | 0048 | 0000 | 0040 | 0042 | 0000 | 004A | 001E | 0014 |
| 066 | FE | 0 | MP1022 | 002C | 0095 | 0038 | 0027 | 00FD | 0000 | 0013 | 004C | 002C | 0045 | 00C0 | 00FC | 0028 | 0033 | 0046 | 004C | 0021 |
| 077 | CA | 0 | MP1022 | 0040 | 0010 | 0045 | 001B | 0028 | 0040 | 0027 | 002A | 0027 | 0000 | 002A | 0000 | 001D | 00C0 | 0043 | 004C | 0094 |
| 088 | 20 | 0 | MP1022 | 002C | 0044 | 004F | 0030 | 002E | 0010 | 0017 | 0070 | 0064 | 0010 | 0043 | 0021 | 0097 | 0066 | 00D2 | 0010 | 00D0 |
| 099 | FA | 0 | MP1022 | 0015 | 0022 | 0036 | 004A | 00E5 | 007E | 004A | 0032 | 002A | 00A2 | 0033 | 0040 | 0020 | 0033 | 0000 | 0030 | 0017 |
| 0AA | 75 | 0 | MP1022 | 000F | 0063 | 0033 | 0017 | 003A | 000D | 0037 | 004A | 0018 | 001C | 0080 | 0002 | 0014 | 00FC | 002F | 0043 | 002E |
| 0BB | C0 | 0 | MP1022 | 0017 | 0033 | 0038 | 002A | 0080 | 0000 | 0019 | 0000 | 0025 | 0060 | 004A | 0016 | 0027 | 002C | 0007 | 000F | 003A |
| 0CC | 09 | 0 | MP1022 | 0060 | 0033 | 0036 | 0014 | 0000 | 0018 | 004F | 001E | 0000 | 0027 | 0040 | 0034 | 0092 | 003A | 0092 | 009B | 0060 |
| 0DD | D5 | 0 | MP1022 | 0013 | 0060 | 0014 | 000C | 0046 | 0009 | 003E | 00C0 | 00E0 | 002C | 0045 | 003B | 0000 | 0000 | 000F | 0043 | 003A |
| 0EE | F7 | 0 | MP1022 | 00F9 | 0019 | 003A | 0025 | 0038 | 002C | 004C | 0000 | 0018 | 001D | 001F | 00E5 | 003B | 00EC | 0010 | 0063 | 0017 |
| 0FF | 36 | 0 | MP1022 | 00F5 | 0000 | 00FC | 0000 | 0017 | 00E5 | 0015 | 009A | 0084 | 0030 | 0012 | 0042 | 00C0 | 0017 | 002E | 002E | 009E |
| 110 | EF | 0 | MP1022 | 0000 | 001A | 001E | 0014 | 001D | 0038 | 0078 | 0014 | 001E | 0035 | 003A | 0042 | 00FC | 0042 | 0080 | 00AF | 0017 |
| 121 | EA | 0 | MP1022 | 00A3 | 0000 | 0030 | 0038 | 003A | 00AE | 004C | 0048 | 00AB | 0092 | 00A1 | 00C0 | 0027 | 003A | 007D | 0035 | 0033 |
| 132 | EB | 0 | MP1022 | 00C0 | 009E | 0007 | 00AB | 0048 | 00B5 | 003A | 00C0 | 0040 | 003E | 001B | 0040 | 001D | 00C0 | 00C0 | 0025 | 0000 |
| 143 | 80 | 0 | MP1022 | 0017 | 00E5 | 0068 | 0068 | 0089 | 00C0 | 0060 | 0016 | 0086 | 0017 | 0060 | 002E | 0044 | 0016 | 00C0 | 00AF | 003D |
| 154 | 16 | 0 | MP1022 | 0074 | 0036 | 0076 | 003F | 0074 | 0017 | 0007 | 000F | 00D2 | 0044 | 0030 | 003F | 0056 | 0024 | 0030 | 0038 | 002E |
| 165 | 96 | 0 | MP1022 | 001D | 0033 | 0069 | 001B | 00BC | 0006 | 0027 | 0025 | 0035 | 003A | 0000 | 0006 | 0033 | 0027 | 0034 | 001E | 00E2 |
| 176 | A0 | 0 | MP1022 | 0048 | 007A | 003A | 00C0 | 00D8 | 003E | 0018 | 0040 | 001D | 00C0 | 00C0 | 0014 | 0000 | 0005 | 001A | 0092 | 003A |
| 187 | 7D | 0 | MP1022 | 0025 | 0091 | 0000 | 003E | 0017 | 003F | 0002 | 001E | 007A | 0000 | 003E | 0079 | 0079 | 00E5 | 0000 | 0032 | 0000 |
| 198 | 53 | 0 | MP1022 | 001A | 001E | 0027 | 0040 | 0036 | 0033 | 0033 | 00D9 | 009A | 0048 | 0000 | 00A6 | 0036 | 007A | 0040 | 0080 | 002E |
| 1A9 | 77 | 0 | MP1022 | 003A | 0000 | 0000 | 0017 | 004C | 0014 | 009A | 0000 | 009E | 0033 | 001E | 003A | 003E | 0042 | 0016 | 003A | 0036 |
| 1BA | DA | 0 | MP1022 | 0013 | 0084 | 0044 | 009E | 0068 | 0064 | 0011 | 0025 | 0000 | 002A | 0046 | 0007 | 0012 | 0014 | 001E | 0015 | 0092 |
| 1CB | 5D | 0 | MP1022 | 0080 | 006B | 003A | 0016 | 0010 | 0033 | 001E | 0038 | 0010 | 007A | 0000 | 00AE | 00C0 | 0007 | 0038 | 00FC | 0050 |
| 1DC | 8D | 0 | MP1022 | 0065 | 0036 | 0046 | 0030 | 0079 | 0084 | 0022 | 00BE | 00C0 | 004C | 002A | 00D1 | 003A | 0048 | 0040 | 001D | 0007 |
| 1ED | 06 | 0 | MP1022 | 002E | 002E | 0042 | 0038 | 0067 | 005B | 0019 | 0014 | 009E | 00C0 | 0038 | 0060 | 0013 | 0048 | 0040 | 0007 | 006F |
| 1FE | 95 | 0 | MP1022 | 00D9 | 0017 | 0000 | 001D | 0000 | 0040 | 003A | 0000 | 0007 | 0014 | 003A | 0002 | 0038 | 0080 | 008F | 00B9 | 001E |
| 20F | CC | 0 | MP1022 | 0097 | 0000 | 0045 | 0050 | 0097 | 0040 | 0014 | 00FC | 0000 | 00D1 | 007C | 004C | 0025 | 0085 | 00C0 | 003E | 009C |
| 220 | 36 | 0 | MP1022 | 00C0 | 0049 | 0000 | 0042 | 003A | 0012 | 0027 | 0033 | 0029 | 0010 | 0000 | 0092 | 0030 | 0019 | 0025 | 0000 | 0028 |
| 231 | 33 | 0 | MP1022 | 007C | 001B | 001E | 0007 | 0011 | 0039 | 00C0 | 0039 | 00BE | 0054 | 0010 | 0003 | 007D | 003E | 0049 | 0060 | 0060 |
| 242 | 1C | 0 | MP1022 | 000F | 0020 | 004F | 0067 | 001D | 0028 | 00A4 | 0025 | 0040 | 0052 | 003E | 00C0 | 0020 | 002C | 0060 | 004C | 0013 |
| 253 | 4F | 0 | MP1022 | 006B | 00A1 | 002C | 0020 | 0020 | 0050 | 00A6 | 0044 | 0042 | 0098 | 0064 | 0020 | 0060 | 0028 | 00C0 | 0060 | 0090 |
| 264 | B4 | 0 | MP1022 | 006B | 0033 | 002D | 0023 | 00A6 | 0029 | 0025 | 0021 | 0060 | 0065 | 0023 | 003A | 0018 | 00AF | 00AB | 0021 | 0018 |
| 275 | 04 | 0 | MP1022 | 0030 | 003F | 00A7 | 00E0 | 0030 | 0060 | 0050 | 0020 | 0067 | 006F | 002F | 0085 | 0042 | 0000 | 0022 | 0045 | 0039 |
| 286 | 3F | 0 | MP1022 | 0045 | 003A | 0035 | 0038 | 00D1 | 00AE | 0021 | 000D | 0021 | 003A | 007B | 0042 | 00D1 | 0035 | 0045 | 0036 | 0049 |
| 297 | 82 | 0 | MP1022 | 0081 | 002A | 0031 | 0099 | 000F | 002A | 00CA | 003A | 000F | 0039 | 0080 | 0051 | 0040 | 0072 | 003A | 0045 | 004A |
| 2A8 | 32 | 0 | MP1022 | 0080 | 0025 | 0035 | 0077 | 000C | 0021 | 004A | 0055 | 0030 | 0028 | 0030 | 0025 | 0070 | 0001 | 002E | 00AD | 000F |
| 2B9 | 33 | 0 | MP1022 | 0035 | 004A | 0000 | 0000 | 00B0 | 002E | 00AD | 0000 | 0060 | 0000 | 002E | 004A | 0051 | 00F6 | 004C | 0027 | 0025 |
| 2CA | DE | 0 | MP1022 | 003F | 0000 | 003A | 0079 | 006A | 002E | 0000 | 0025 | 000D | 0095 | 0097 | 0068 | 0003 | 0000 | 002E | 0025 | 007A |
| 2DB | C4 | 0 | MP1022 | 0027 | 009F | 0007 | 0007 | 0040 | 002C | 007A | 0000 | 0027 | 0044 | 007A | 0030 | 00A3 | 0079 | 0007 | 0025 | 008D |
| 2EC | 68 | 0 | MP1022 | 0027 | 004A | 002C | 000F | 003E | 0007 | 0035 | 0002 | 002A | 003E | 0097 | 0069 | 0069 | 005D | 002E | 0003 | 000D |
| 2FD | 60 | 0 | MP1022 | 0088 | 0039 | 0036 | 0000 | 0049 | 0000 | 007F | 0040 | 0000 | 0027 | 000B | 002A | 0041 | 0033 | 0027 | 0002 | 0039 |
| 30E | 33 | 0 | MP1022 | 000D | 003A | 0052 | 0003 | 0007 | 000A | 0039 | 0000 | 0034 | 002A | 000C | 0027 | 0000 | 0095 | 002A | 0049 | 0008 |
| 31F | 05 | 0 | MP1022 | 004E | 000D | 0000 | 00A6 | 003E | 0041 | 0030 | 004E | 002A | 0068 | 0039 | 0041 | 00A6 | 0099 | 004E | 0020 | 0032 |
| 330 | AC | 0 | MP1022 | 0049 | 0092 | 0041 | 0000 | 002A | 0041 | 000A | 0027 | 0039 | 0027 | 000D | 0008 | 0049 | 0027 | 0077 | 000D | 0000 |
| 341 | 2D | 0 | MP1022 | 002E | 0000 | 000D | 007D | 0038 | 004E | 000F | 00A2 | 00BD | 0027 | 00AE | 0002 | 0004 | 003E | 0030 | 0007 | 0025 |
| 352 | 66 | 0 | MP1022 | 0046 | 0003 | 0003 | 0025 | 0037 | 007E | 000A | 002A | 0046 | 00A3 | 0021 | 0002 | 007A | 0051 | 003A | 0034 | 0083 |
| 363 | D3 | 0 | MP1022 | 0060 | 00AC | 0007 | 005C | 0007 | 00A2 | 0056 | 0025 | 0007 | 0093 | 0021 | 0026 | 000C | 0051 | 007C | 000D | 0003 |
| 374 | CA | 0 | MP1022 | 0046 | 0007 | 0026 | 0005 | 00AF | 002A | 000E | 000C | 000A | 0077 | 0000 | 000D | 003F | 0006 | 0000 | 002A | 004F |
| 385 | 50 | 0 | MP1022 | 0005 | 0064 | 0028 | 0044 | 00A4 | 0025 | 0056 | 0021 | 003D | 0083 | 0028 | 0052 | 0068 | 002E | 002E | 009D | 0008 |
| 396 | 52 | 0 | MP1022 | 0078 | 0020 | 0078 | 0034 | 0027 | 0060 | 002C | 0073 | 007B | 0061 | 0078 | 003D | 00AA | 0021 | 0021 | 0007 | 0042 |
| 3A7 | 3E | 0 | MP1022 | 0040 | 000F | 0097 | 0055 | 007F | 000F | 0030 | 0060 | 0077 | 0062 | 002E | 0051 | 000F | 0046 | 0064 | 0050 | 0078 |
| 3B8 | EE | 0 | MP1022 | 000F | 0060 | 003D | 0042 | 0042 | 00A7 | 0026 | 0027 | 0000 | 0097 | 0005 | 007F | 004F | 0038 | 002E | 0060 | 002E |
| 3C9 | 62 | 0 | MP1022 | 0003 | 009B | 00AD | 003C | 0049 | 000D | 002F | 0099 | 0064 | 0049 | 004F | 0018 | 0083 | 000E | 004F | 00C0 | 0000 |

TI-6657

TABLE I (CONTINUED)

| | | | | | | | | | | | | | | | | | | | |
|---|---|---|---|---|---|---|---|---|---|---|---|---|---|---|---|---|---|---|---|---|
| 3DA | BB | 0 | MP1022 | 0038 | 0065 | 00DD | 0070 | 002D | 0028 | 003A | 006C | 000B | 0064 | 0022 | 0063 | 0048 | 002C | 0049 | 009D | 0030 |
| 3EB | F1 | 0 | MP1022 | 002A | 0093 | 001B | 007E | 0010 | 0065 | 0021 | 0042 | 008A | 006C | 0023 | 00DD | 0024 | 002B | 0029 | 0049 | 002F |
| 3FC | 6C | 0 | MP1022 | 002E | 00DD | 007A | 00DD | 0000 | 0028 | 0000 | 002E | 004A | 0043 | 0056 | 0052 | 0021 | 0007 | 00A9 | 0035 | 003A |
| 40D | FF | 0 | MP1022 | 0028 | 0042 | 0060 | 0080 | 0044 | 002C | 0028 | 009C | 0080 | 002E | 0025 | 0021 | 0028 | 002C | 0043 | 00BE | 0021 |
| 41E | A6 | 0 | MP1022 | 0003 | 004B | 008B | 0073 | 00BD | 0025 | 0047 | 002E | 0000 | 0018 | 0033 | 0027 | 0007 | 0079 | 0028 | 0040 | 0033 |
| 42F | 90 | 0 | MP1022 | 0034 | 002E | 0014 | 0075 | 0044 | 0037 | 004B | 00D7 | 004F | 00C0 | 0039 | 0031 | 0023 | 000B | 0015 | 0080 | 0014 |
| 440 | 60 | 0 | MP1022 | 0098 | 004D | 0000 | 0027 | 0028 | 0021 | 001F | 0021 | 000B | 002E | 0023 | 002E | 0047 | 00C0 | 00DD | 0098 | 00DC |
| 451 | 2C | 0 | MP1022 | 0013 | 002E | 0001 | 0017 | 0047 | 0050 | 0028 | 0013 | 0084 | 0014 | 0047 | 003E | 000B | 0073 | 0085 | 002A | 00A1 |
| 462 | A3 | 0 | MP1022 | 0018 | 004F | 00A6 | 00DD | 0013 | 0081 | 00AD | 0060 | 0001 | 0021 | 0025 | 008A | 0047 | 0000 | 0013 | 0060 | 00A4 |
| 473 | 5F | 0 | MP1022 | 0000 | 0023 | 0013 | 0028 | 0043 | 0059 | 008C | 002A | 002C | 0027 | 0000 | 0010 | 002C | 001C | 0098 | 0080 | 004F |
| 484 | E7 | 0 | MP1022 | 002A | 0024 | 0018 | 0014 | 0091 | 0010 | 0000 | 0048 | 0021 | 0000 | 0036 | 00AD | 00C0 | 0028 | 0018 | 0080 | 0021 |
| 495 | C9 | 0 | MP1022 | 0028 | 0001 | 00E5 | 0039 | 002E | 0017 | 0098 | 0028 | 002A | 0093 | 0014 | 0000 | 00AD | 00C8 | 0098 | 0013 | 0001 |
| 4A6 | EE | 0 | MP1022 | 0080 | 0003 | 0021 | 0028 | 0017 | 0017 | 0023 | 00AC | 0000 | 008B | 0031 | 0000 | 0018 | 00C0 | 0016 | 004B | 0013 |
| 4B7 | 24 | 0 | MP1022 | 0021 | 00A7 | 00AD | 0001 | 0047 | 0001 | 0014 | 001B | 00ED | 0000 | 0011 | 0000 | 001B | 00EC | 0038 | 009E | 0039 |
| 4C8 | FA | 0 | MP1022 | 0022 | 00C0 | 0027 | 00A1 | 000B | 0040 | 0018 | 001F | 0000 | 002C | 002F | 0093 | 0016 | 001E | 004C | 000B | 0095 |
| 4D9 | C6 | 0 | MP1022 | 003A | 0000 | 0038 | 0048 | 003A | 0044 | 0033 | 0044 | 003A | 00C0 | 003E | 0064 | 004F | 0042 | 0017 | 00DF | 0016 |
| 4EA | 33 | 0 | MP1022 | 003F | 00C0 | 0048 | 0033 | 00C0 | 001C | 0012 | 0092 | 000B | 000B | 0080 | 0084 | 001D | 0033 | 003A | 002C | 0093 |
| 4FB | 60 | 0 | MP1022 | 00A6 | 003A | 0014 | 001B | 0080 | 0087 | 0044 | 0080 | 002C | 004F | 0014 | 00A6 | 003A | 0038 | 004F | 0097 | 003A |
| 50C | 6E | 0 | MP1022 | 0022 | 004C | 001B | 009B | 001A | 0099 | 009D | 0016 | 0092 | 0022 | 009E | 000F | 00DD | 0040 | 0012 | 0038 | 002F |
| 51D | A5 | 0 | MP1022 | 00C0 | 001C | 0018 | 00C0 | 0030 | 007C | 0048 | 0038 | 001A | 00D1 | 002C | 003A | 003A | 003E | 002D | 0042 | 001B |
| 52E | 43 | 0 | MP1022 | 0027 | 0003 | 00A6 | 0019 | 001D | 00AB | 0095 | 0012 | 0078 | 0048 | 000B | 008E | 003A | 000B | 0007 | 0093 | 008D |
| 53F | EC | 0 | MP1022 | 007B | 0030 | 007C | 0000 | 007D | 0027 | 0085 | 0017 | 0014 | 001D | 00A6 | 003A | 0096 | 008F | 00C0 | 0005 | 0018 |
| 550 | A8 | 0 | MP1022 | 0040 | 001B | 00C0 | 0092 | 0060 | 004C | 0007 | 0095 | 007D | 0048 | 003A | 001B | 0060 | 0012 | 00E8 | 0003 | 000F |
| 561 | CE | 0 | MP1022 | 0003 | 0016 | 0044 | 0042 | 00DD | 00C0 | 0038 | 0097 | 00D9 | 000B | 0038 | 002F | 0080 | 0010 | 000D | 00E5 | 001E |
| 572 | 08 | 0 | MP1022 | 0027 | 00A6 | 00DD | 003A | 000B | 0012 | 00D1 | 0000 | 0017 | 00AB | 001F | 0019 | 0017 | 00C0 | 0000 | 001E | 0000 |
| 583 | C4 | 0 | MP1022 | 003A | 008C | 00C0 | 0021 | 002C | 002A | 00FC | 0048 | 0003 | 0038 | 007D | 0022 | 0037 | 0080 | 0040 | 0043 | 0027 |
| 594 | 57 | 0 | MP1022 | 001A | 0019 | 001F | 000B | 0017 | 004D | 000F | 0027 | 0097 | 002D | 009B | 002C | 000B | 002D | 0000 | 0021 | 0035 |
| 5A5 | C9 | 0 | MP1022 | 0027 | 004F | 0010 | 002C | 0027 | 001E | 00D1 | 0084 | 00C0 | 0038 | 002A | 0022 | 002C | 00C0 | 000B | 0085 | 0021 |
| 5B6 | 43 | 0 | MP1022 | 0016 | 007C | 0084 | 00A6 | 004F | 0021 | 0014 | 001A | 003A | 0048 | 0000 | 001E | 0000 | 0015 | 00DD | 003A | 00A6 |
| 5C7 | 2E | 0 | MP1022 | 00A6 | 0027 | 0034 | 003E | 008D | 0003 | 001E | 0018 | 0060 | 0000 | 0092 | 002D | 0027 | 0011 | 0036 | 004C | 0000 |
| 5D8 | 87 | 0 | MP1022 | 0095 | 0022 | 003A | 00BF | 0048 | 003A | 0044 | 00BD | 0040 | 003A | 0000 | 0038 | 0011 | 0084 | 0042 | 00A2 | 003E |
| 5E9 | 40 | 0 | MP1022 | 00A6 | 0000 | 0089 | 0038 | 0038 | 00C0 | 004F | 0014 | 0092 | 000B | 00B2 | 002C | 0029 | 001D | 0038 | 003A | 00DD |
| 5FA | 62 | 0 | MP1022 | 0048 | 00A6 | 0038 | 0014 | 001B | 0080 | 0014 | 0080 | 0092 | 001F | 00C0 | 002C | 0077 | 0004 | 0020 | 00E1 | 001D |
| 60B | 2E | 0 | MP1022 | 004F | 000B | 0027 | 002D | 0011 | 0064 | 0029 | 002F | 0000 | 0022 | 002D | 0030 | 002C | 0080 | 0036 | 0091 | 0004 |
| 61C | 48 | 0 | MP1022 | 001E | 0038 | 0022 | 002F | 0027 | 007F | 0003 | 0021 | 00A6 | 0027 | 0027 | 0023 | 00E1 | 00AC | 0043 | 0027 | 000F |
| 62D | DC | 0 | MP1022 | 0032 | 004F | 00AD | 002B | 0098 | 0007 | 0005 | 0000 | 0023 | 002C | 003A | 0007 | 009D | 0034 | 00AC | 00C0 | 0029 |
| 63E | 74 | 0 | MP1022 | 0016 | 000B | 008F | 0060 | 0000 | 004A | 002C | 0060 | 003A | 0038 | 003A | 00FC | 008C | 000F | 0021 | 00A6 | 0028 |
| 64F | DD | 0 | MP1022 | 0082 | 0079 | 0040 | 0099 | 0048 | 001B | 003E | 0021 | 007A | 004C | 0038 | 0019 | 0038 | 0040 | 0044 | 0048 | 001D |
| 660 | C3 | 0 | MP1022 | 0060 | 0042 | 0027 | 0015 | 0038 | 0019 | 0021 | 0015 | 000B | 0041 | 0080 | 0015 | 00DD | 0028 | 0028 | 004C | 0013 |
| 671 | 67 | 0 | MP1022 | 004E | 0025 | 0085 | 00A6 | 0095 | 0021 | 002C | 002C | 0046 | 00C0 | 0027 | 0028 | 0027 | 002C | 0027 | 00C0 | 0027 |
| 682 | 8E | 0 | MP1022 | 0000 | 0025 | 0019 | 008F | 0045 | 00DD | 00D1 | 00A6 | 001D | 002E | 0059 | 0021 | 0060 | 0018 | 0040 | 00FC | 000B |
| 693 | 05 | 0 | MP1022 | 00C0 | 0049 | 004C | 0079 | 0095 | 0059 | 000F | 003A | 002C | 00A5 | 0060 | 000B | 002C | 008F | 002E | 001D | 0013 |
| 6A4 | 6B | 0 | MP1022 | 0042 | 0019 | 004A | 0038 | 0010 | 00B0 | 000B | 0038 | 0021 | 0025 | 00C0 | 0027 | 0027 | 002C | 007D | 00A6 | 0048 |
| 6B5 | 70 | 0 | MP1022 | 000B | 001E | 0007 | 0000 | 0003 | 0040 | 000F | 002E | 0019 | 0031 | 004A | 0000 | 000B | 0000 | 003A | 00AF | 0015 |
| 6C6 | 23 | 0 | MP1022 | 00A4 | 0068 | 0064 | 008C | 0060 | 0082 | 0013 | 0077 | 00AB | 0080 | 0000 | 0003 | 000B | 00A4 | 0044 | 0004 | 007C |
| 6D7 | 36 | 0 | MP1022 | 003C | 000B | 0042 | 0077 | 0091 | 0038 | 0025 | 0088 | 0073 | 00C0 | 0027 | 0000 | 008D | 000B | 0086 | 00A7 | 0000 |
| 6E8 | 3A | 0 | MP1022 | 0092 | 00AB | 0000 | 001D | 003E | 0027 | 0015 | 0027 | 0078 | 003E | 001E | 0011 | 0074 | 003E | 0080 | 007D | 0049 |
| 6F9 | 1E | 0 | MP1022 | 003A | 00A3 | 003E | 0058 | 002E | 0019 | 004C | 0000 | 0060 | 0000 | 0045 | 0060 | 004E | 0049 | 0047 | 009A | 0000 |
| 70A | 34 | 0 | MP1022 | 0023 | 000C | 0041 | 0007 | 0005 | 0098 | 0000 | 0096 | 001F | 0018 | 0005 | 0000 | 0096 | 0000 | 0036 | 00A9 | 0010 |
| 71B | 03 | 0 | MP1022 | 00A9 | 007F | 005D | 00B3 | 0082 | 0045 | 002E | 0000 | 00C0 | 0000 | 0027 | 0070 | 000C | 001D | 003A | 0000 | 0000 |
| 72C | 28 | 0 | MP1022 | 0055 | 00A1 | 007F | 0007 | 000F | 007F | 0053 | 00D7 | 0025 | 006C | 0027 | 0041 | 0027 | 009E | 000B | 008F | 0006 |
| 73D | 5A | 0 | MP1022 | 0006 | 0006 | 00AF | 0000 | 007F | 0000 | 004A | 0032 | 0077 | 0027 | 0045 | 0027 | 0000 | 0027 | 000B | 0046 | 002A |
| 74E | 69 | 0 | MP1022 | 0027 | 0010 | 0000 | 0021 | 0043 | 0035 | 0083 | 0000 | 003F | 0000 | 0068 | 0091 | 00B7 | 0043 | 006F | 0040 | 000B |
| 75F | A3 | 0 | MP1022 | 004D | 0028 | 0049 | 0000 | 0021 | 0037 | 0049 | 00B7 | 0000 | 004D | 004C | 0090 | 0000 | 002A | 00AC | 0044 | 002E |
| 770 | ED | 0 | MP1022 | 002E | 0048 | 0040 | 0000 | 0021 | 002E | 0027 | 0028 | 0027 | 008D | 0021 | 0037 | 0060 | 00A3 | 00CB | 0067 | 0047 |
| 781 | 92 | 0 | MP1022 | 006A | 0092 | 002A | 004B | 0062 | 0025 | 004F | 0013 | 0022 | 0027 | 002A | 0039 | 0060 | 006A | 004F | 002C | 0093 |
| 792 | BC | 0 | MP1022 | 003E | 0018 | 0047 | 0029 | 0060 | 0034 | 0082 | 002C | 003E | 000F | 004F | 0068 | 0082 | 000D | 0040 | 004C | 0060 |
| 7A3 | 54 | 0 | MP1022 | 00AD | 0001 | 004F | 0040 | 0047 | 0038 | 0040 | 0043 | 0001 | 0007 | 006C | 0069 | 009C | 000C | 0028 | 0028 | 0027 |
| 7B4 | 13 | 0 | MP1022 | 0021 | 0043 | 0060 | 0028 | 00AC | 0040 | 0073 | 0082 | 003B | 003B | 0028 | 009D | 000B | 002C | 0084 | 002C | 0043 |
| 7C5 | 62 | 0 | MP1022 | 004F | 004F | 002C | 000E | 002C | 0043 | 0022 | 0038 | 0022 | 004F | 004F | 0043 | 0034 | 0047 | 003A | 0029 | 004F |
| 7D6 | E5 | 0 | MP1022 | 0091 | 0047 | 002A | 0043 | 0022 | 002D | 00A4 | 0022 | 0027 | 002A | 0027 | 002C | 0030 | 009F | 00AB | 0036 | 0090 |
| 7E7 | BB | 0 | MP1022 | 0021 | 0027 | 0070 | 0027 | 0003 | 0021 | 0077 | 004F | 002A | 0027 | 0038 | 0047 | 002D | 0021 | 0025 | 002A | 0021 |
| 7F8 | 59 | 0 | MP1022 | 0043 | 0021 | 004D | 0023 | 004F | 002C | 002F | 0022 | 0000 | 0000 | 0000 | 0000 | 0000 | 0000 | 0000 | 0000 | 0000 |
| 809 | EF | 0 | MP1022 | 0000 | 0000 | 0000 | 0000 | 0000 | 0000 | 0000 | 0000 | 0000 | 0000 | 0000 | 0000 | 0000 | 0000 | 0000 | 0000 | 0000 |
| 81A | DE | 0 | MP1022 | 0000 | 0000 | 0000 | 0000 | 0000 | 0000 | 0000 | 0000 | 0000 | 0000 | 0000 | 0000 | 0000 | 0000 | 0000 | 0000 | 0000 |
| 82B | CD | 0 | MP1022 | 0000 | 0000 | 0000 | 0000 | 0000 | 0000 | 0000 | 0000 | 0000 | 0000 | 0000 | 0000 | 0000 | 0000 | 0000 | 0000 | 0000 |
| 83C | BC | 0 | MP1022 | 0000 | 0000 | 0000 | 0000 | 0000 | 0000 | 0000 | 0000 | 0000 | 0000 | 0000 | 0000 | 0000 | 0000 | 0000 | 0000 | 0000 |
| 84D | AB | 0 | MP1022 | 0000 | 0000 | 0000 | 0000 | 0000 | 0000 | 0000 | 0000 | 0000 | 0000 | 0000 | 0000 | 0000 | 0000 | 0000 | 0000 | 0000 |
| 85E | 9A | 0 | MP1022 | 0000 | 0000 | 0000 | 0000 | 0000 | 0000 | 0000 | 0000 | 0000 | 0000 | 0000 | 0000 | 0000 | 0000 | 0000 | 0000 | 0000 |
| 86F | 89 | 0 | MP1022 | 0000 | 0000 | 0000 | 0000 | 0000 | 0000 | 0000 | 0000 | 0000 | 0000 | 0000 | 0000 | 0000 | 0000 | 0000 | 0000 | 0000 |

TI-6657

TABLE II

```
ROM CODE ASSEMBLY

 000 B9 0 MP6061   0023 004C 00B0 003D 0046 000D 0046 00A5 004B 00A4 004F 002C 002A 0022 003D 003A 0030
 011 CB 0 MP6061   0054 00B6 0003 00A1 0045 0094 0080 00DE 0003 0099 0050 009E 0010 003E 0021 0092 003D
 022 DE 0 MP6061   0047 0056 001F 0033 0080 00AA 0081 0019 0014 0038 0046 001A 00A8 0047 0008 0026 002F
 033 F0 0 MP6061   0039 0034 001C 0038 00AB 0018 0045 000F 003B 0001 0049 000A 0003 003B 002B 0000 003D
 044 5B 0 MP6061   004D 0021 0006 00EB 000E 00CF 002F 0048 0038 00A9 002C 000D 002E 009C 00E6 0007 000D
 055 97 0 MP6061   002E 000F 002E 0040 004C 002F 0021 0088 009D 009D 00CF 0022 0021 001D 00CF 0044 00C9
 066 88 0 MP6061   009D 009B 0010 0022 002B 002B 000F 0021 003C 0007 00FD 003E 000D 000F 00C9 000D 00AF
 077 87 0 MP6061   0040 00B3 002C 0011 003D 003F 002C 0022 004D 001A 000F 0039 0049 0039 0007 0032 004E
 088 48 0 MP6061   0080 0021 0003 0088 00A7 0008 006F 006A 0070 0015 00B7 003E 003E 0078 0084 00A7 0021
 099 86 0 MP6061   00EC 00A7 0041 0009 0010 00A7 00A7 0027 0045 0095 0021 0046 0078 004E 00FD 0041 003A
 0AA 38 0 MP6061   001A 00AA 0026 004E 0026 0010 003D 0036 0046 0011 0003 000A 003E 0045 0045 00A7 006A
 0BB 1C 0 MP6061   0080 009D 003D 0007 00EB 0010 0080 009C 003D 0038 003E 001A 0045 0045 00EC 0028 0046
 0CC FD 0 MP6061   00B5 002A 0080 0003 001F 0088 0034 001D 002A 000A 00C7 0043 00B7 00EB 000F 00AB 0043
 0DD 3D 0 MP6061   0036 003D 004E 001E 006A 00EB 003E 0095 003D 0010 0010 0026 00BE 0031 0060 00D3 0034
 0EE 1A 0 MP6061   00A7 002A 0093 0099 0032 00B7 0069 001C 003A 0034 003A 000F 002A 00B7 007E 0047 0030
 0FF A9 0 MP6061   009D 0099 002A 0000 0049 0012 00EB 0028 00AA 00AB 0080 0068 001A 0026 0079 0047 004D
 110 91 0 MP6061   001A 0028 001E 001A 003D 0040 001A 0007 007A 007A 0038 00AB 009D 0060 00D7 003B 0060
 121 1F 0 MP6061   004D 00FC 0073 00AC 007D 003F 0016 0060 003E 0007 002A 0045 0028 001F 0028 003C 00C6
 132 42 0 MP6061   00AB 00A5 0060 00AB 004E 004D 001F 0060 00AC 006A 003D 004E 0041 0031 0018 0039 00B2
 143 F9 0 MP6061   004D 0023 009B 0039 003A 009C 0080 00AE 003A 00BC 00EB 0003 0021 0021 0086 0049 0086
 154 A3 0 MP6061   00A4 0005 003D 003D 000F 0032 0074 001C 0046 003E 0087 0034 004B 001F 000F 0030 002C
 165 07 0 MP6061   0034 003C 0010 00A9 0003 0041 0003 0049 0003 003A 0049 0043 0040 003D 00A5 00B7 0038
 176 8F 0 MP6061   0080 003F 000E 0039 0036 0003 0081 002F 004F 003D 0030 0021 008D 0040 003B 0005 0021
 187 B8 0 MP6061   003D 003E 0060 004D 0093 00AF 0072 0026 0040 0064 0038 0049 001D 002B 0060 00B3 003E
 198 59 0 MP6061   0040 0037 0022 0093 0039 0096 00DE 0070 002B 002B 003D 0060 00A3 0091 002F 0060 000F
 1A9 5C 0 MP6061   0074 0049 0060 0021 008D 003F 0045 002B 0022 0022 0060 003D 0035 00DE 000E 0040 003E
 1BA 0E 0 MP6061   0093 002B 00BB 003C 00DE 003D 001A 0085 00AC 0049 0039 0005 0037 006C 003F 00A2 0011
 1CB D2 0 MP6061   00BD 008F 0047 0047 003A 0011 003B 004D 0080 0047 00D2 0005 00A2 0060 0039 00A5 0037
 1DC D6 0 MP6061   00BB 003F 00A1 003D 0006 004B 00C8 000F 004F 0089 0068 0068 0043 0096 0003 0060 0069
 1ED 66 0 MP6061   00BD 001C 004F 0035 00BD 0028 00D2 0034 00A5 0003 0006 002A 0097 0049 0028 0043 0041
 1FE 2D 0 MP6061   00AF 0038 0017 003D 0080 003C 004B 0047 009B 0043 0030 002B 002E 0038 0021 004B 0040
 20F A9 0 MP6061   000F 004B 001E 009C 0001 00A3 002B 002A 003F 0038 0033 0018 001F 007D 003A 000F 0092
 220 F7 0 MP6061   0030 001E 0003 003D 002E 00A5 0011 00FD 00C0 004D 000F 0021 003B 0003 002B 00BA 00C8
 231 B6 0 MP6061   0080 00B0 00CF 003B 001A 002B 003F 0026 00CF 0033 00B0 003F 0019 0018 002F 0093 00CF
 242 1C 0 MP6061   0000 003D 0047 002B 0021 0043 0022 008A 0023 0027 0011 0018 002E 002B 0033 00D1 0011
 253 A0 0 MP6061   0040 0097 002E 0091 0011 0043 00B4 002B 00CF 0038 0027 00FD 0007 0018 004D 0012 0099
 264 2C 0 MP6061   0022 0040 002F 0070 0091 0007 00B3 000F 00B4 003C 0011 00AD 003C 00B3 0021 002E 0027
 275 80 0 MP6061   0007 00CF 00B4 007D 0018 0091 00BA 00A6 002E 0088 003B 00B3 0080 0080 0021 0013 0021
 286 16 0 MP6061   00AF 001B 009E 003F 003A 0013 003B 009F 0038 00BE 001D 001B 00BF 0083 003B 0060 0039
 297 CC 0 MP6061   00C0 001B 0080 004D 0021 008B 0021 007C 0039 00BB 003A 003B 0021 0038 003A 007A 0034
 2A8 F5 0 MP6061   00A6 00AE 0041 001A 0083 00A8 008F 003B 001B 0086 003A 0032 0013 0039 00B7 003B 0072
 2B9 38 0 MP6061   003A 008A 0013 0039 00A1 001B 00AA 0012 000E 0080 0013 00CF 000E 0092 003A 0010 002B
 2CA FC 0 MP6061   00A6 001A 0023 0060 0045 00B3 00AB 003B 0080 002E 00FC 00B3 004D 001A 008B 0092 002E
 2DB 73 0 MP6061   0045 008F 0031 006C 0049 0028 0065 0060 002E 0013 009E 008E 0013 001F 003D 0079 0034
 2EC FE 0 MP6061   003D 003A 003F 00AD 003E 00DF 0040 0092 0038 0040 0036 0033 001A 0030 0037 004D 0013
 2FD 5E 0 MP6061   00DA 004D 0084 0087 003F 0000 0049 009C 0003 002B 008E 0035 001D 000F 001D 0045 00BE
 30E DC 0 MP6061   004D 0093 0087 0037 004D 003C 009E 0099 0001 0037 0032 0033 0048 0043 0023 0001 0039
 31F 50 0 MP6061   0087 0007 00CF 0042 003B 0016 00AD 0013 00CF 0093 0036 004C 0044 004D 0098 001D 00B4
 330 E4 0 MP6061   0023 0088 0034 0023 0006 0012 000F 0030 003A 004F 0043 0096 0045 0092 0092 0039 008C
 341 C0 0 MP6061   0080 0000 002F 009E 004D 0001 005D 00FC 0060 0093 003D 002F 008D 004D 0018 0022 0095
 352 F1 0 MP6061   0040 0045 003A 0060 00A1 000F 004D 0013 00CF 00E5 00AF 0021 000E 0001 0010 00CF 0014
 363 91 0 MP6061   0022 0033 0001 000F 00AA 0018 0026 0040 0060 00A9 003D 000E 00D5 0018 0003 0037 0001
 374 7A 0 MP6061   001A 00CF 000E 0049 0041 000E 00FC 003E 000E 000E 000E 000E 0064 0007 00BC 0018 00CF
 385 F4 0 MP6061   0094 001E 0021 009D 0021 004B 0043 0011 002A 0043 009C 003E 0043 003F 0027 0021 0043
 396 F9 0 MP6061   0021 0094 0027 00BD 0007 00BD 00FD 0039 00B3 0029 009C 004B 004B 004F 00A6 0039 00A1
 3A7 E3 0 MP6061   0047 00A3 004B 009C 0029 0047 004F 0039 0026 003E 001C 00B0 0094 0043 001F 003D 003F
 3B8 69 0 MP6061   00B4 0020 0094 00A4 0011 003A 0043 00E5 0062 0043 0084 003F 0040 0039 0035 00A6 00A1
 3C9 49 0 MP6061   003A 0068 00B1 0060 004A 0064 0093 0039 000F 003E 003D 0031 00A6 0031 0084 0062 0046
 3DA 84 0 MP6061   001C 002F 0050 006E 003C 002F 003D 00B6 00A6 0038 0012 001C 0063 003E 000A 0043 003E
 3EB 26 0 MP6061   0064 004A 003E 00C1 000D 000D 004B 0064 0030 0001 0021 003E 0080 003C 00C3 0007 0010
 3FC 6F 0 MP6061   0033 00C3 003D 000F 0000 0000 0000 0000 0000 0000 0000 0000 0000 0000 0000 0000 0000
 40D EF 0 MP6061   0000 0000 0000 0000 0000 0000 0000 0000 0000 0000 0000 0000 0000 0000 0000 0000 0000
 41E DE 0 MP6061   0000 0000 0000 0000 0000 0000 0000 0000 0000 0000 0000 0000 0000 0000 0000 0000 0000
 42F CD 0 MP6061   0000 0000 0000 0000 0000 0000 0000 0000 0000 0000 0000 0000 0000 0000 0000 0000 0000

END OF ROM CODE ASSEMBLY
```

What is claimed is:

1. An electronic digital thermostat system for controlling heating and cooling systems supplying an indoor area to maintain desired ambient temperatures during selected time periods in said area, said thermostat system comprising:

(a) temperature sensing means including at least one temperature sensor for sensing the ambient temperature of said area and for providing a digital signal indicative thereof;

(b) oscillator means for generating time pulses;

(c) digital processor means having a plurality of input and output terminals, said digital processor means being coupled to said oscillator means and said temperature sensing means for receiving said time pulses and for continually monitoring said ambient temperature, said digital processor means including a memory for storing digital coded information entered therein while said information is being processed, said digital processor means being responsive to real time and ambient temperature and to said digital coded information for controlling the heating and cooling systems in accordance with a permanently stored instruction sequence to maintain said desired ambient temperature;

(d) data entry means coupled to said digital processor means for entering said digital coded information into said digital processor means, said data entry means including:

(i) means for selecting certain ones of a plurality of operating modes of the thermostat system; and (ii) keyboard means having a plurality of keys for entering digital coded time and temperature information into said digital processor means, said data entry means being selectively coupled between a plurality of said input and output terminals of said digital processor means, said digital processor means including means for selectively applying electrical signals to said keys via said output terminals and for receiving encoded electrical signals from said keys via said input terminals in response to said selectively applied electrical signals;

(e) digital display means for displaying desired parameters of time and temperature including information entered from said keyboard means, said display means being coupled to selected ones of said output terminals of said digital processor means;

(f) electrically controllable switch means coupled to at least one of said output terminals for selectively activating and deactivating said heating and cooling systems in accordance with signals from said digital processor means; and (g) connector means for connecting said thermostat system to the heating and cooling systems and to a power supply.

2. A thermostat system according to claim 1 wherein said display means comprises a plurality of light emitting diodes for displaying a plurality of digits, each digit being formed from a plurality of activatable segments.

3. A thermostat system according to claim 2 wherein said display means comprises four digits.

4. A thermostat system according to claim 1 wherein said display means includes a plurality of light emitting diodes for displaying seven days of the week and a morning/afternoon indication.

5. A thermostat system according to claim 1 wherein said temperature sensing means includes:

(i) at least one sensistor means for measuring the ambient temperature of the indoor area, the electrical resistance of said sensistor means varying in accordance with the ambient temperature, and (ii) analog to digital converter means for converting an analog indication of temperature to a digital indication thereof and for providing said digital signal.

6. A thermostat system according to claim 5 wherein said at least one sensistor means comprises at least one silicon spreading resistor.

7. A thermostat system according to claim 1 wherein said digital processor means is a single semiconductor chip digital processor means which comprises:

(i) a programmed ROM containing said permanently stored instruction sequence;

(ii) an arithmetic logic unit for performing arithmetic and logic operations on data according to said instruction sequence; and (iii) a RAM for storing said digital coded information entered from said keyboard means while said information is being processed by said digital processor means.

8. A thermostat system according to claim 1 wherein said digitial processor means is programmed to include a known delay time period whereby said digital processor means will not trigger said controllable switch means to activate or deactivate said heating and cooling systems until each system has remained in its respective state of deactivation or activation for at least said delay time period.

9. A thermostat system according to claim 1 wherein said digital processor means is programmed to calculate the time rate of change of the ambient temperature during periods when the cooling system is activated and alternatively when the heating system is activated, thereby adapting the digital processor means to selectively deactivate heating and cooling in anticipation of the desired ambient temperature being reached, thereby eliminating overshooting of the desired ambient temperature.

10. The thermostat system according to claim 1 wherein said digital processor means is programmable via said keyboard means to operate on a plurality of time and temperature commands each of which represents a desired ambient temperature and a selected time whereby said digital processor means will automatically control the operation of said heating and cooling systems to maintain said desired ambient temperatures in accordance with said plurality of time and temperature commands.

11. A thermostat system according to claim 10 wherein said digital processor means includes a seven day digital clock and is programmable for a seven day cycle of operation.

12. A thermostat system according to claim 1 wherein said controllable switch means includes a triac.

13. A thermostat system according to claim 1 wherein said temperature sensing means includes a bimetallic temperature sensor connected to said heating system to function as a safety backup for the thermostat system, said bimetallic temperature sensor activating said heating system into operation when the ambient temperature drops below a selected threshold level.

14. The thermostat system according to claim 1 wherein said keyboard means is coupled to at least some of said output terminals in common with said temperature sensing means whereby said keyboard means and said temperature sensing means are scanned simultaneously.

15. The thermostat system according to claim 1 further comprising a battery power supply as backup power supply for said digital processor means in the event of failure of said rectified DC voltage, said battery power supply enabling said digital processor means to retain said digital coded temperature and time information programmed therein and to continue timekeeping operations.

16. The thermostat system according to claim 1 wherein said temperature sensing means comprises a plurality of temperature sensors for measuring the temperature at selected locations indoors and outdoors and wherein said thermostat system includes means for programming said thermostat system to be responsive to selected ones of said plurality of temperature sensors.

17. The thermostat system according to claim 1 further comprising at least one humidity sensor for measuring the humidity of a particular area and means for selectively activating and deactivating a humidifier.

18. The thermostat system according to claim 1 further comprising means for selectively programming said thermostat system for a staged heating and cooling mode of operation wherein said heating and cooling systems are operated at less than their peak rates so that heating and cooling occurs at a reduced rate and alternatively for a normal heating and cooling mode wherein said heating and cooling systems operate at their peak rates so that heating and cooling occurs at a maximum rate.

19. The thermostat system according to claim 1 including means for selectively opening and closing at least one motor driven damper means located in a duct supplying warm and cool air to an indoor zone, thereby controlling the supply of said warm and cool air to said zone.

20. An electronic digital thermostat system for controlling heating and cooling systems supplying an indoor area to maintain desired ambient temperatures during selected time periods in said area, said thermostat system comprising:

(a) temperature sensing means having at least one temperature sensor for measuring the ambient temperature of said area and for providing a digital signal indicative thereof, (b) oscillator means for generating time pulses;

(c) digital processor means having input and output means and being electrically coupled to said oscillator means and said temperature sensing means, for receiving said time pulses and for continually monitoring said ambient temperature, said digital processor means including:

(i) a ROM having a permanently stored instruction sequence, (ii) a RAM for storing digital coded information entered therein while said information is being processed, said digital coded information including said desired temperatures and selected times at the beginning and end of said time periods, and (iii) means responsive to said time pulses for generating a digital signal corresponding to real time;

(iv) means for comparing said digital signal corresponding to real time and said digital signal indicative of ambient temperature with said stored digital coded selected times and said stored digital coded desired temperatures, said digital processor means being responsive thereto for controlling the heating and cooling systems to maintain said desired temperatures in accordance with said instruction sequence;

(d) data entry means coupled to said input means for entering said digital coded information into said digital processor means;

(e) electrically controllable switch means coupled to said output means for selectively activating and deactivating said heating and cooling systems in accordance with signals from said digital processor means; and (f) connector means for connecting said thermostat system to the heating and cooling systems and to a power supply.

21. The thermostat system according to claim 20 wherein said data entry means comprises:

(i) keyboard means having a plurality of keys and being coupled to said input means for entering digital coded time and temperature information into said digital processor means in accordance with the state of said keys;

(ii) means for programming the thermostat system to operate in selected ones of a plurality of operating modes, including automatic or manual and heating or cooling.

22. An electronic digital thermostat system for controlling heating and cooling systems supplying an indoor area to maintain desired ambient temperatures during selected time periods in said area, said thermostat system comprising:

(a) temperature sensing means having at least one temperature sensor for measuring the ambient temperature of said area and for providing a digital signal indicative thereof;

(b) oscillator means for generating time pulses;

(c) digital processor means having input and output means and being coupled to said oscillator means and said temperature sensing means for receiving said time pulses and for continually monitoring said ambient temperature, said digital processor means including a memory for storing digital coded information entered therein while said information is being processed, said digital processor means being responsive to said time pulses and ambient temperature and to said digital coded information for controlling said heating and cooling systems to maintain said desired temperatures in accordance with a permanently stored instruction sequence;

(d) data entry means coupled to said input means for entering said digital coded information into said digital processor means, said digital coded information including a plurality of time and temperature instructions, each of said instructions corresponding to a desired temperature and a selected time for which the thermostat system is programmed to change the ambient temperature to the respective desired temperature, said digital processor means being responsive thereto for automatically maintaining the respective desired temperature;

(e) digital display means coupled to said output means of said digital processor means for displaying desired parameters of time and temperature, said digital processor means being responsive to selected ones of a plurality of signals from said data entry means for activating said display means to display said desired parameters of time and temperature;

(f) electrically controllable switch means coupled to said output means for selectively activating and deactivating said heating and cooling systems in accordance with signals from said digital processor means; and (g) connector means for connecting said thermostat system to the heating and cooling systems and to a power supply.

23. The thermostat system according to claim 22 wherein at least one of said selected time periods is seven days.

24. An electronic digital thermostat system for controlling heating, cooling and humidifying systems supplying an indoor area to maintain desired ambient temperatures during selected time periods and a desired humidity in said area, said thermostat system comprising:

(a) temperature sensing means having at least one temperature sensor for measuring the ambient temperature of said area and for providing a digital signal indicative thereof;

(b) oscillator means for generating time pulses;

(c) humidity sensing means comprising at least one humidity sensor for measuring the humidity in an area and for providing a digital signal indicative thereof;

(d) digital processor means having input and output means, said digital processor means being coupled to said temperature sensing means, said oscillator means and said humidity sensing means for receiving said time pulses and for continually monitoring said ambient temperature and humidity, said digital processor means including a memory for storing digital coded information programmed therein while said information is being processed, said digital processor means being responsive to said time pulses, ambient temperature and humidity and to said digital coded information for controlling said heating, cooling and humidifying systems in accordance with a permanently stored instruction sequence to maintain said desired temperatures and humidity;

(e) data entry means coupled to said input means for entering said digital coded information into said digital processor means, said digital coded information including said desired ambient temperatures and selected times at the beginning and end of said time periods, said data entry means including means for programming said digital processor means to selectively activate and deactivate said humidifying system;

(f) digital display means coupled to said output means for displaying desired parameters of time, temperature and humidity, said digital processor means being responsive to selected ones of a plurality of signals from said data entry means for activating said display means to display said desired parameters;

(g) electrically controllable switch means coupled to said output means for selectively activating and deactivating said heating, cooling and humidifying systems in accordance with signals from said digital processor means; and (h) connector means for connecting said thermostat system to the heating, cooling and humidifying systems and to a power supply.

25. An electronic digital thermostat system for controlling heating and cooling systems supplying an indoor area to maintain desired ambient temperatures during selected time periods in said area, said thermostat system comprising:

(a) temperature sensing means having at least one temperature sensor for measuring the ambient temperature of said area and for providing a digital signal indicative thereof, (b) oscillator means for generating time pulses;

(c) digital processor means having input and output means and being electrically coupled to said oscillator means and said temperature sensing means for receiving said time pulses and for continually monitoring said ambient temperature, said digital processor means including:

(i) a memory for storing digital coded temperature and time instructions including first, second, third and fourth desired temperatures and respective first, second, third and fourth selected times during a daily cycle, said selected times representing four separate times during each day for which the thermostat system is programmable to change the ambient temperature to the respective desired temperature;

(ii) means responsive to said time pulses for generating a digital signal corresponding to real time; and (iii) means for comparing said digital signal corresponding to real time and said digital signal indicative of ambient temperature with said first, second, third and fourth desired temperatures and said first, second, third and fourth selected times, said digital processor means being responsive thereto for controlling the heating and cooling systems to maintain the desired temperatures;

(d) data entry means coupled to said input means for entering said digital coded temperature and time instructions into said digital processor means;

(e) digital display means coupled to said output means for displaying desired parameters of time and temperature;

(f) electrically controllable switch means coupled to said output means for selectively activating and deactivating said heating and cooling systems in accordance with signals from said digital processor means; and (g) connector means for connecting said thermostat system to the heating and cooling systems and to a power supply.

26. The thermostat system according to claim 25 wherein said digital coded temperature and time instructions further include fifth and sixth desired temperatures and respective fifth and sixth selected times during a daily cycle, said fifth and sixth selected times representing two separate times during each day for which the thermostat system is programmable to change the ambient temperature to the respective desired temperature, said thermostat system being settable to control the ambient temperature in accordance with said fifth and sixth desired temperatures and selected times and alternatively being settable to control the ambient temperature in accordance with said first, second, third and fourth desired temperatures and selected times.

* * * * *